United States Patent [19]

Liechti et al.

[11] Patent Number: 5,055,567
[45] Date of Patent: Oct. 8, 1991

[54] DISPERSE DYES WHICH ARE CONVERTIBLE INTO A THERMO-MIGRATION FAST FORM

[75] Inventors: Peter Liechti, Arisdorf; Karl Emmenegger, Pratteln; Martin Trottmann, Oberwil, all of Switzerland

[73] Assignee: Ciba-Geigy Corporation, Ardsley, N.Y.

[21] Appl. No.: 335,641

[22] Filed: Apr. 10, 1989

[30] Foreign Application Priority Data

Apr. 14, 1988 [CH] Switzerland .......................... 1381/88

[51] Int. Cl.$^5$ .................... C09B 29/36; C09B 29/08; C09B 57/00; D06P 1/16
[52] U.S. Cl. .................................. 534/753; 534/585; 534/754; 534/761; 534/772; 534/773; 534/787; 534/788; 534/790; 534/792; 534/794; 534/795; 534/798; 534/850; 534/852; 534/854; 534/856; 544/316; 546/226; 548/253
[58] Field of Search ............... 534/585, 768, 770, 788, 534/798, 850, 852, 761, 753, 754, 772, 773, 787, 792, 794, 795; 564/74, 163, 164, 170; 546/226; 558/234, 403

[56] References Cited

U.S. PATENT DOCUMENTS

| | | | |
|---|---|---|---|
| 2,069,740 | 2/1937 | Fleischhauer et al. | 534/798 X |
| 3,637,653 | 1/1972 | Brachel et al. | 534/850 X |
| 3,869,442 | 3/1975 | Weaver et al. | 534/850 X |
| 4,119,621 | 10/1978 | Hansen et al. | 534/788 |

FOREIGN PATENT DOCUMENTS

| | | |
|---|---|---|
| 2108710 | 5/1972 | France . |
| 46-23508 | 7/1971 | Japan . |
| 824443 | 12/1959 | United Kingdom ........... 534/850 |
| 1241705 | 8/1971 | United Kingdom ........... 534/852 |
| 1428115 | 3/1976 | United Kingdom ........... 534/852 |
| 1458369 | 12/1976 | United Kingdom ........... 534/850 |
| 2144443 | 3/1985 | United Kingdom ........... 534/788 |

OTHER PUBLICATIONS

Niwa et al., Chemical Abstracts; vol. 104, No. 150738b (1986).
Wunderlich et al., Chemical Abstracts, vol. 62; No. 5366f (1965).

Primary Examiner—Mary C. Lee
Assistant Examiner—Fiona T. Powers
Attorney, Agent, or Firm—George R. Dohmann; Edward McC. Roberts

[57] ABSTRACT

The dyes according to the invention consist of a chromophore and a radical which, on heating, forms an isocyanate or isothiocyanate group. The latter reacts with a suitable group in the environment. Dyeings of excellent thermomigration fastness are obtained. The disclosed dyes are of the formulae

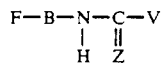 (1)

or

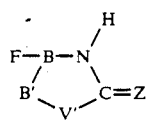 (2)

where
F is the radical of an azo, anthraquinone or tricyanovinyl dye which is free of water-solubilizing groups,
B and B' are each independently of the other a direct bond or a bridge member, selected from the group consisting of a straight-chain or branched alkylene group having 2 to 8 C atoms or one of the following groups

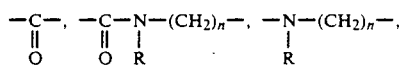

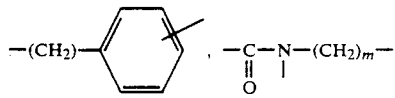

where R is hydrogen or $C_1$–$C_6$alkyl, n is an integer from 1 to 8 and m is an integer from 2 to 4,
Z is O or S,
V is a group which at a temperature between 180° and 240° C. is eliminated as a radical HV, and
V' is a direct bond which is cleaved at a temperature between 180° and 240° C. or is a group which at such temperature turns, by ring opening and cleavage of the bond V'-C, into a group V'H, with the provisos that in the azo dyes the diazo component is not aminobenzisothiazole and the coupling component is not N-($\beta$-phenylureidoethyl)-1-naphthylamine when the diazo component is 2,4-dinitro-6-bromoaniline.

11 Claims, No Drawings

DISPERSE DYES WHICH ARE CONVERTIBLE INTO A THERMO-MIGRATION FAST FORM

The present invention relates to novel disperse dyes, processes for preparing same and processes for dyeing and printing using same.

Disperse dyes, i.e. dyes that contain no water-solubilizing groups, have been known for a long time and are used as dyes, for example for dyeing hydrophobic textile material. Frequently, however, the dyeings obtained are not sufficiently fast to thermomigration.

Past attempts to overcome this defect have led to the development of specific dyes whose diffusibility is very low in consequence of their molecular size and/or bulkiness. However, this makes it more difficult to apply such dyes, since they are barely appliable by the exhaust method, if at all, and even in thermosoling usually require undesirably high fixing temperatures.

The present invention, then, provides disperse dyes which are appliable in a conventional manner and which are convertible into a thermo-migration-fast form by a thermal aftertreatment.

The dyes according to the invention contain, attached to a water-in-soluble chromophore, a radical which, on heating to a temperature above 150° C., forms an isocyanate or isothiocyanate group.

The dyes according to the invention conform to the formulae

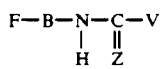  (1)

and

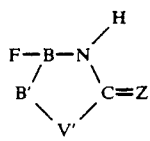  (2)

where
F is the radical of an azo, anthraquinone or tricyanovinyl dye which is free of water-solubilizing groups,
B and B' are each independently of the other a bridge member or a direct bond,
Z is O or S,
V is a group which at elevated temperature is eliminated as a radical HV, and
V' is a direct bond which is cleaved at elevated temperature or is a group which at elevated temperature turns, by ring opening and cleavage of the bond V'-C, into a group V'H, with the provisos that in the azo dyes the diazo component is not aminobenzisothiazole and the coupling component is not N-($\beta$-phenylureidoethyl)-1-naphthylamine when the diazo component is 2,4-dinitro-6-bromoaniline.

The elimination of the radical HV from compounds of the formula (1) and the cleavage of the direct bond V' or of the bond V'C in compounds of the formula (2) give rise to, respectively, isocyanate and isothiocyanate groups which are capable of reacting with suitable groups in the environment, for example with the hydroxyl groups present as end groups on the polyester or on oligomers thereof, or with amines of the formula F-B-NH$_2$, which are formed from the isocyanates or isothiocyanates by hydration and decarboxylation and react with a further isocyanate or isothiocyanate molecule to give compounds of the formula

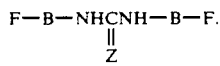

The radical F is the radical of a water-insoluble chromophore, for example the radical of one of the known disperse dyes. Possibilities are anthraquinone dyes, tricyanovinyl dyes and azo dyes, such as monoazo and disazo dyes.

The bridge member B or B' is for example a straight-chain or branched alkylene group having 2 to 8 C atoms or is one of the following groups

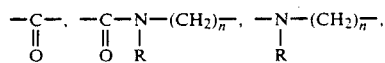

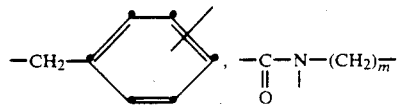

where R is hydrogen or C$_1$-C$_6$alkyl, n is an integer from 1 to 8 and m is an integer from 2 to 4.

Examples of possible radicals V are radicals of the formulae

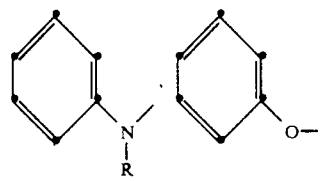

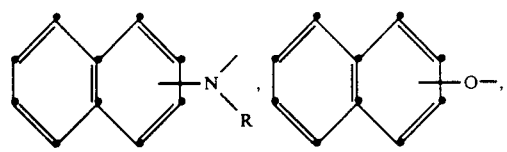

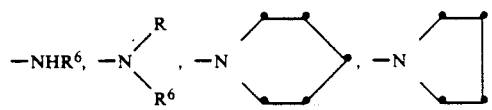

where R is hydrogen or C$_1$-C$_6$alkyl and R$^6$ is C$_1$-C$_6$alkyl or C$_5$-C$_7$cycloalkyl, which radicals may be further substituted, for example by C$_1$-C$_4$alkyl, C$_1$-C$_4$alkoxy, C$_1$-C$_4$alkoxycarbonyl, C$_1$-C$_4$alkylamino, C$_1$-C$_4$alkanoylamino, nitro, cyano, halogen, such as bromine or chlorine, C$_1$-C$_4$alkoxy-C$_1$-C$_4$alkyl or C$_1$-C$_4$alkoxy-C$_1$-C$_4$alkoxy.

Z is O or S, preferably O.

Preferred dyes according to the invention conform to the formula

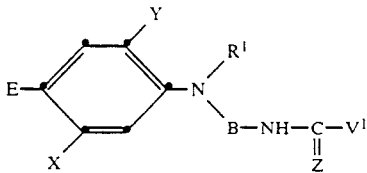

where
E is D—N=N— or

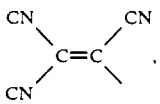

where D is the radical of the carbocyclic or heterocyclic diazo component other than aminobenzisothiazole, X is hydrogen, $C_1$-$C_4$alkyl, $C_1$-$C_4$alkoxy, acylamino, halogen, $C_1$-$C_4$alkylsulfonylamino or a group of the formula —NH—CO—NHQ where Q is hydrogen, $C_1$-$C_4$alkyl or phenyl, Y is hydrogen, halogen, $C_1$-$C_4$alkyl, $C_1$-$C_4$alkoxy, $C_1$-$C_4$alkoxy-$C_1$-$C_4$alkyl or $C_1$-$C_4$alkoxy-$C_2$-$C_4$alkoxy, $R^1$ is $C_1$-$C_{12}$alkyl, $C_2$-$C_6$alkenyl or phenyl, or Y and $R^1$, together with the nitrogen atom and the two C atoms joining them, form a 5- or 6-membered ring, B is a straight-chain or branched $C_2$-$C_6$alkylene radical, Z is O or S and $V^1$ is a radical

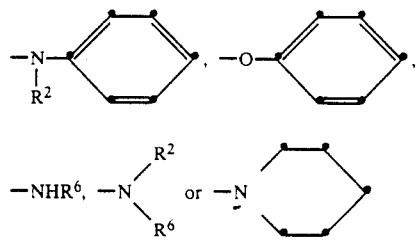

which may be substituted in the phenyl ring by $C_1$-$C_4$alkyl, $C_1$-$C_4$alkoxy, $C_1$-$C_4$alkoxycarbonyl or halogen, where $R^2$ is $C_1$-$C_6$alkyl and $R^6$ is $C_1$-$C_6$alkyl or $C_5$-$C_7$cycloalkyl.

A further preferred class of dyes according to the invention conforms to the formula

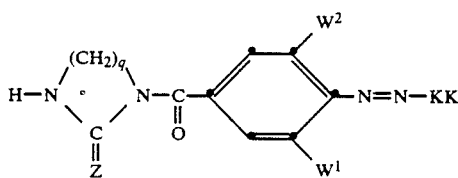

where
Z is O or S, $W^1$ and $W^2$ are each independently of the other hydrogen, $C_1$-$C_4$alkyl, CN, $CF_3$, $C_1$-$C_4$alkylsulfonyl, halogen, such as bromine or chlorine, or nitro, q is an integer from 2 to 6 and KK is the radical of a coupling component.

If in the dyes of the formula (3) E is a radical D—N=N—, then D is the radical of a homocyclic or heterocyclic diazo component, for example from the group consisting of thienyl, phenylazothienyl, thiazolyl, isothiazolyl, 1,2,4-thiadiazolyl, 1,3,4-thiadiazolyl, benzothiazolyl, pyrazolyl, 1,2,3-triazolyl, 1,2,4-triazolyl, imidazolyl and phenyl.

Each of these systems may carry further substituents such as alkyl, alkoxy or alkylthio each having 1 to 4 carbon atoms, phenyl, electronegative groups such as halogen, in particular chlorine or bromine, trifluoromethyl, cyano, nitro, acyl, for example acetyl or benzoyl, carboalkoxy, in particular carbomethoxy or carboethoxy, alkyl sulfone having 1 to 4 carbon atoms, phenyl sulfone, phenoxy sulfone, sulfonamido or arylazo, in particular phenylazo. Every 2 adjacent substituents on the ring systems mentioned may also combine together to form further fused-on rings, for example phenyl rings or cyclic imides.

Preferably, D is a benzothiazolyl or phenyl radical which is unsubstituted or monosubstituted or disubstituted by one of the abovementioned radicals.

A benzothiazolyl radical D is in particular an unsubstituted or methyl-, methoxy-, chlorine-, methylsulfonyl- or nitro-monosubstituted or -poly-substituted benzothiazolyl radical.

The preferred meaning of D is phenyl which is substituted by not more than 4 identical or different substituents from the above-recited list. Of the substituents listed, the electronegative ones are preferred. They can be in particular cyano, methylsulfonyl, ethylsulfonyl, nitro, chlorine, bromine, formyl, acetyl, benzoyl, carbomethoxy, carboethoxy, methoxy, ethoxy and phenylazo.

For the purposes of this application, alkyl groups are in general to be understood as meaning straight-chain or branched or cyclic alkyl groups, for example those having 1 to 12 carbon atoms. They are for example methyl, ethyl, propyl, i-propyl, butyl, i-butyl, tert-butyl, amyl, tert-amyl (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, decyl, dodecyl, cyclopentyl, cyclohexyl, methylcyclohexyl and the corresponding isomers.

These alkyl radicals may be substituted, for example by hydroxy, alkoxy having 1 to 4 carbon atoms, in particular methoxy, halogen, such as bromine or chlorine, cyano or phenyl. Suitable further substituents are halogen, such as fluorine, chlorine or bromine, and —CO—U or —O—CO—U, where U is alkyl having 1 to 6 carbon atoms or phenyl.

Suitable alkenyl radicals are those radicals which are derived from the abovementioned alkyl radicals by replacement of at least one single bond by a double bond. Suitable radicals are for example ethenyl and propenyl.

Suitable alkoxy radicals are for example methoxy, ethoxy, propoxy, iso-propoxy, n-butoxy, i-butoxy and tert-butoxy.

Examples of suitable substituted alkyl radicals are: methoxymethyl, ethoxymethyl, ethoxyethyl, ethoxypropyl, n-propoxymethyl, iso-propoxymethyl, butoxymethyl, butoxyethyl, butoxypropyl, ethoxypentyl, methoxybutyl, ethoxypentyl, 2-hydroxyethoxypentyl, cyanoethyl, hydroxyethyl and acetoxyethyl.

The alkylene radicals B can be straight-chain or branched or even substituted. Examples of possibilities are ethylene, 1,3-propylene, 1,5-pentylene, 1,2-propylene, 1,2-butylene, 1,6-hexylene, 2-hydroxy-1,3-propylene and 2-chloro-1,3-propylene.

An acylamino group X is for example a group of the formula $$-NH-U-R^3 \quad (5)$$

where U is —CO— or —SO$_2$— and R$^3$ is unsubstituted or substituted alkyl or phenyl.

The acyl radical is for example the acetyl, propionyl, 2-chloroethylcarbonyl, 2-bromoethylcarbonyl, phenylcarbonyl, 2-methoxycarbonylethylcarbonyl, 2-ethoxycarbonylethylcarbonyl, methoxycarbonyl, ethoxycarbonyl, phenoxycarbonyl, methoxyethylcarbonyl, hydroxyethylcarbonyl, methylsulfonyl or ethylsulfonyl radical.

A group X of the formula —NH—CO—NHQ is for example a ureido, methylureido, ethylureido or phenylureido group. For the purposes of this application, phenyl radicals are in general to be understood as meaning unsubstituted or substituted phenyl radicals. Examples of possible substituents are C$_1$-C$_4$alkyl, C$_1$-C$_4$alkoxy, bromine, chlorine, nitro and C$_1$-C$_4$alkylcarbonylamino.

Halogen in this application is in general fluorine, bromine and in particular chlorine.

R$^1$ and Y can form together with the nitrogen atom and the two C atoms joining them a 5- or 6-membered ring which may contain an oxygen atom as further hetero atom. Suitable substituents for these rings are for example hydroxyl, methyl, methoxy, chlorine and phenyl. Preferably, R$^1$ and Y together with the nitrogen atom and the two C atoms joining them form a 6-membered ring which is unsubstituted or carries 1 to 4 methyl groups. The compounds are thus in particular di- or tetrahydroquinoline compounds having 0 to 4 methyl groups.

In particularly preferred disperse dyes, D is benzothiazolyl radical which is unsubstituted or monosubstituted to disubstituted by chlorine or is a phenyl radical which is monosubstituted to disubstituted by nitro, chlorine, cyano, methylsulfonyl, ethylsulfonyl or phenylazo.

The preferred meanings of X are hydrogen, methyl, methoxy, chlorine, bromine, acetylamino and ureido, of which hydrogen, methyl, chlorine and acetylamino are particularly preferred.

Y is preferably chlorine, methyl, methoxy, methoxyethyl or methoxyethoxy or in particular hydrogen.

The preferred meaning of R$^2$ is C$_1$-C$_4$alkyl, which may be substituted by hydroxyl or C$_1$-C$_4$alkoxy. In particularly preferred compounds of the formula (3) R$^2$ is methyl or ethyl. Preferred groups V$^1$ are radicals

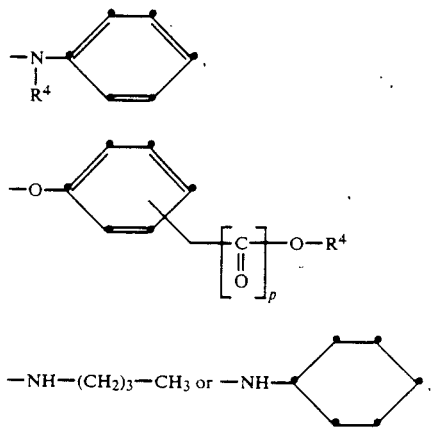

where R$^4$ is C$_1$-C$_4$alkyl and p is 0 or 1.

In the dyes of the formula (4), KK is the radical of a coupling component.

As coupling component KK, there may be used the coupling components customary in azo chemistry and known from the literature of the field.

Of the large number of possibilities, there may be mentioned as examples: coupling components of the benzene series, of the naphthalene series, of open-chain active methylene compounds (for example of the acylacetarylamides), and of the heterocyclic series.

Examples of the aforementioned radicals of coupling components KK are radicals from the series of the acylacetarylamides, phenols, pyridones, quinolines, pyrazoles, indoles, diphenylamine, anilines, aminopyridines, pyrimidines, pyrimidones, naphthols, naphthylamines, aminothiazoles, thiophenes and hydroxypyridines.

Particularly noteworthy radicals KK are those from the series of the acetoacetanilides, phenols, anilines, diphenylamines, naphthylamines, naphthols, indoles, quinolines, pyridones, pyrazolones, quinolones and aminopyridines.

These coupling components may carry further substituents which are customary in dye chemistry for coupling components, for example hydroxyl, amino, alkylamino, dialkylamino, halogen, alkoxy, aryl, aryloxy, alkylcarbonylamino, arylcarbonylamino or alkylsulfonylamino.

Owing to their particularly good dyeing properties, particularly preferred dyes of the formula (4) are those where KK is the radical of an aniline, naphthylamine or tetrahydroquinoline and each of these radicals may be substituted by C$_1$-C$_4$alkyl, C$_1$-C$_4$alkylcarbonylamino, phenyl or C$_1$-C$_4$alkylphenyl.

In the dyes of the formula (4), W$^1$ and W$^2$ are preferably independently of each other hydrogen, methyl, methoxy, chlorine or nitro, and n is preferably 3 or 4.

Particularly useful dyes according to the invention conform to the formulae

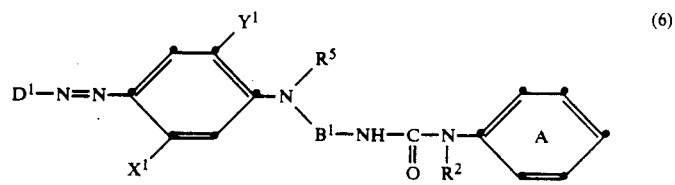

(6)

-continued

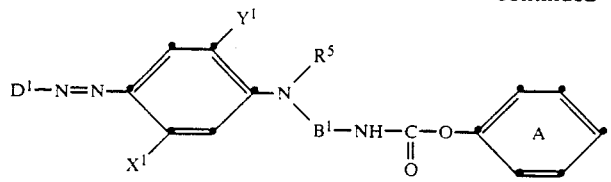 (7)

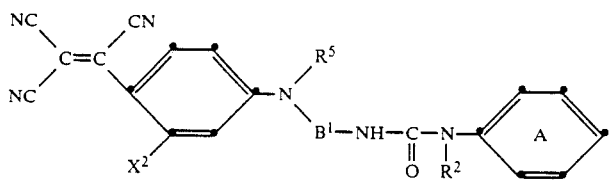 (8)

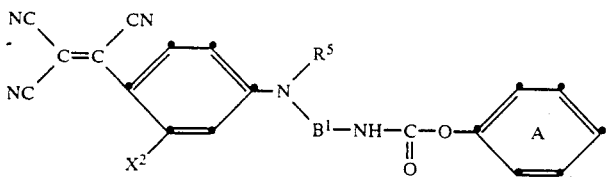 (9)

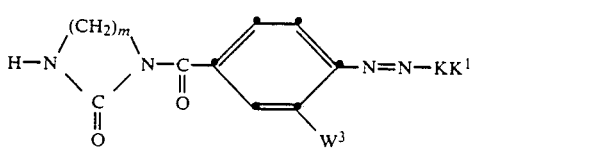 (10)

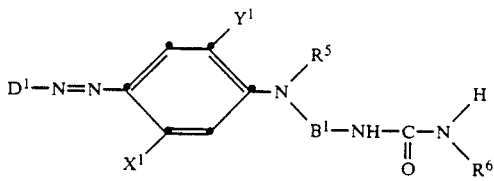 (22)

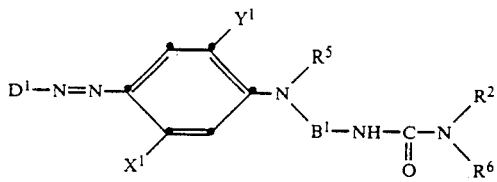 (23)

or

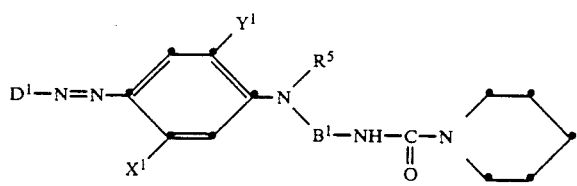 (24)

In the formulae (6) to (10) and (22) to (24) the symbols have the following meanings:

$D^1$ is a benzothiazolyl radical which is unsubstituted or monosubstituted or disubstituted by chlorine or is a phenyl radical which is monosubstituted or disubstituted by nitro, halogen, cyano, methylsulfonyl, ethylsulfonyl or phenylazo, $X^1$ is hydrogen, methyl, methoxy, chlorine, bromine or $C_1$-$C_4$alkanoylamino, $Y^1$ is chlorine, methyl, methoxy, methoxyethyl, methoxyethoxy or hydrogen, $X^2$ is hydrogen, methyl, methoxy, chlorine or bromine, $R^2$ is $C_1$-$C_6$alkyl, $R^5$ is $C_1$-$C_4$alkyl which is unsubstituted or substituted by hydroxyl, cyano, $C_1$-$C_4$alkoxy or phenyl, $R^6$ is $C_1$-$C_6$alkyl or $C_5$-$C_7$cycloalkyl, $B^1$ is a $C_2$-$C_4$alkylene radical which is unsubstituted or substituted by hydroxyl, A is a phenyl ring which is unsubstituted or substituted by $C_1$-$C_4$alkyl, $C_1$-$C_4$alkoxy, $C_1$-$C_4$alkoxycarbonyl or chlorine, m is 2, 3 or 4, $W^3$ is hydrogen, methyl, methoxy, chlorine or nitro and $KK^1$ is the radical of an aniline, naphthylamine or tetrahydroquinoline, each of which may be substituted by $C_1$-$C_4$alkyl, $C_1$-$C_4$alkylcarbonylamino, phenyl, $C_1$-$C_4$alkylphenyl or sulfo, or is the radical of a hydroxypyridone which is substituted by CN or $C_1$-$C_{12}$alkyl.

The dyes according to the invention are prepared in a conventional manner, for example by introducing into a water-insoluble chromophore, or into a precursor thereof, a radical which, on heating to a temperature above 150° C., forms an isocyanate or isothiocyanate group.

The dyes of the formula (1) according to the invention are for example prepared by reacting a dye of the formula

F—B—NH$_2$     (20)

with a compound

Hal—C—V     (21)
  ‖
  Z where F, B, Z and V are as defined under the formula (1) and Hal is chlorine or bromine. The compounds of the formulae (20) and (21) are known or can be prepared in a manner known per se. The reaction conditions for the reaction of a compound of the formula (20) with a compound of the formula (21) conform to the customary reaction conditions for the reactions of amines with acyl halides. For example, the reaction is carried out in an inert solvent at about 20° C. in the presence of a base.

The dyes of the formula (1) can also be prepared by reacting a compound of the formula (20) under conventional reaction conditions with an isocyanate or isothiocyanate, for example with butyl isocyanate or cyclohexyl isocyanate.

The dyes of the formula (3) are prepared for example by reacting a diazotized amine of the formula

D—NH$_2$     (11)

or tetracyanoethylene with a compound of the formula

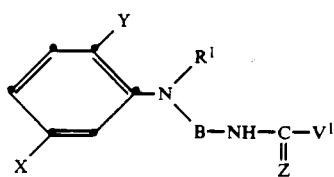
(12)

The compounds of the formula (11) are known or can be prepared by analogy with the preparation of similar compounds.

The compounds of the formula (12) are prepared for example by reacting a haloalkyl isocyanate or haloalkyl isothiocyanate of the formula Hal—B—N=C=Z     (13)

with a compound of the formula

V$^1$—H     (14)

and reacting the resulting reaction product of the formula

Hal—B—N—C—V$^1$     (15)
        |   ‖
        H   Z with a compound of the formula

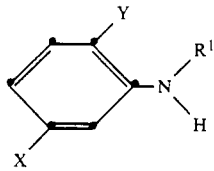
(16)

In the compounds (11) to (16), D, X, Y, $R^1$, B, Z and $V^1$ are as defined under the formula (3) and Hal is chlorine or bromine.

The compounds of the formulae (13) to (16) are known or can be prepared in a manner known per se.

In the reaction of compound (13) with compound (14), preference is given to working in an inert solvent in the presence of a catalyst, for example diazabicyclooctane, at a temperature between about 0° C. and 20° C. The components (13) and (14) can be used in a stoichiometric ratio, although an excess of one of the components is also possible. After the reaction has ended, the compound (15) is isolated in a conventional manner, for example by crystallization.

The reaction of compound (15) with compound (16) is carried out for example in an inert organic solvent in the presence of a base. Examples of inert organic solvents are compounds having a boiling point above 60° C., such as alcohols, ethers, esters, nitrobenzene, halobenzene, toluene, xylenes and the like. Particular suitability is possessed by alcohols, for example isopropanol, and the base used is for example sodium carbonate or potassium carbonate. It is also possible to carry out this reaction without solvent.

Components (15) and (16) can be used in a stoichiometric ratio, but an excess of one of the components, preferably compound (16), will frequently prove more favourable.

The reaction temperature is approximately between 50° and 120° C., preferably between 60° and 100° C., and the reaction time is, depending on the temperature and reactants, about 1 to 20 hours. After the reaction has ended, any excess component (16) and the solvent are removed, and the residue is purified if necessary, for example by recrystallization. The diazotization of compound (11) and the coupling with compound (12) are effected in a conventional manner.

The reaction of the compounds of the formula (12) with tetracyanoethylene is effected in a conventional manner, preferably in an inert solvent at a temperature between about 20° and 100° C., with the reaction components being used in approximately equivalent amounts.

A suitable inert solvent for the above reaction is for example a halogen compound such as chloroform or chlorobenzene, an ether, an aromatic compound, such as benzene, toluene or xylene, but in particular pyridine or dimethylformamide.

The dyes of the formula (3) are isolated for example by pouring the reaction solutions into ice-water and filtering off the precipitated dye, washing if necessary and drying.

The dyes of the formula (4) are prepared for example by reacting a compound of the formula

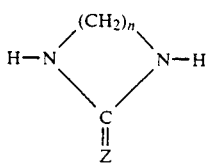   (17)

with a compound of the formula

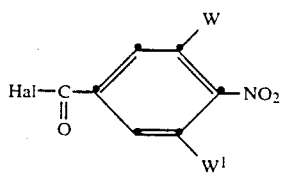   (18)

reducing the resulting reaction product of the formula

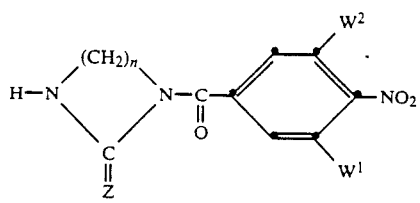   (19)

to the corresponding amine in a conventional manner, and diazotizing the amine and coupling it with a coupling component H—KK.

The dyes according to the invention can be used for dyeing and printing cellulosic and in particular synthetic hydrophobic fibre materials, in particular textile materials. Textile materials made of blend fabrics which contain such cellulosic or synthetic hydrophobic textile materials can likewise be dyed or printed with the compounds according to the invention.

Synthetic hydrophobic textile materials consist in particular of linear aromatic polyesters, for example those of terephthalic acid and glycols, in particular ethylene glycol, or condensation products of terephthalic acid and 1,4-bis(hydroxymethyl)cyclohexane, polycarbonates, for example those of α,α-dimethyl-4,4'-dihydroxydiphenylmethane and phosgene, and of fibres based on polyvinyl chloride and polyamide.

The compounds according to the invention are applied to the textile materials by existing dyeing methods. For example, polyester fibre materials are dyed by the exhaust method from an aqueous dispersion in the presence of customary anionic or nonionic dispersants in the presence or absence of customary carriers at temperatures between 80° and 140° C. The fibre materials made of secondary acetate rayon are preferably dyed between approximately 65° to 85° C. and those made of cellulose triacetate at temperatures of up to 115° C.

Some of the dyes according to the invention, however, are suitable in particular for dyeing by thermosoling.

For application of the dye, the textile material can be present in a wide range of forms, for example as fibre, yarn or web or as woven or knitted fabric.

It is advantageous to convert the dyes according to the invention before use into a dye preparation. To this end, the dye is ground in such a way that its particle size is on average between 0.01 and 10 microns. The grinding can take place in the presence of dispersants. For example, the dried dye is ground together with a dispersant or kneaded in paste form with a dispersant and then dried in vacuo or by spray-drying. The preparations thus obtained are then suitable for dyeing and printing on addition of water.

In printing, the customary thickening agents are used, for example modified or non-modified natural products, for example aliginates, british gum, gum arabic, crystal gum, carob bean flour, tragacanth, carboxymethylcellulose, hydroxyethylcellulose, starch or synthetic products, for example polyacrylamides, polyacrylic acid or copolymers thereof, or polyvinyl alcohols.

Following the actual dyeing, the dyeings obtained are subjected to a thermal aftertreatment, for example by being heated to a temperature between 180° and 240° C., preferably between 200° and 230° C., for 30 to 500 seconds, preferably 45 to 200 seconds. This thermal aftertreatment brings about a significant improvement in the thermomigration fastness of the dyeings, since the dyes are converted by elimination of the corresponding radicals into dyes having isocyanate or isothiocyanate groups. These groups can then react with suitable groups on the fibres or on the reagents present on the fibres, for example with amino or hydroxyl groups.

If the dyeings were produced by thermosoling, which normally includes a thermofix at about 180°–210° C., a separate thermal aftertreatment can be dispensed with for some of the dyes according to the invention. Alternatively, it is advisable to carry out the thermofix at elevated temperature, for example 200° to 230° C., and/or for a prolonged period, for example 120 to 300 seconds.

The dyes according to the invention confer on the materials mentioned, in particular polyester material, level yellow to blue colours of very good end-use fastness properties, in particular good light fastness, sublimation fastness, fastness to dry heat setting and pleating, chlorinated water and wet fastness such as water, perspiration and wash fastness; the dyeings are further characterized by food rub fastness and fastness to dry heat setting and pleating. In addition, the dyeings obtained are very deep.

The examples further illustrate the invention without limiting it. Parts and percentages are by weight, unless otherwise stated.

EXAMPLE 1

A diazonium chloride solution prepared from 3.45 g of 2-chloro-4-nitroaniline in conventional manner is added dropwise over 20 minutes at 0° to 5° C. to a solution of the coupling component of the formula

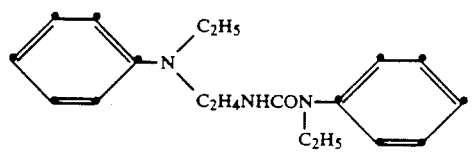

in 100 ml of glacial acetic acid. Three hours' stirring at 0° to 5° C., filtering off with suction, washing and drying gives 4.4 g of the crude dye of the formula

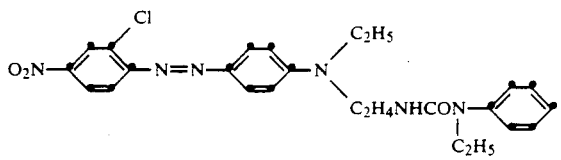

as a brown powder of melting point 166°–169° C. Column chromatography over silica gel with ethyl acetate as mobile phase gives green, metallically bright crystals of melting point 190°–192° C. The dye dyes polyester material in red shades.

The coupling component used is prepared as follows:

21.2 g of chloroethyl isocyanate are added dropwise over 30 minutes to a solution of 24.4 g of N-ethylaniline and 0.2 g of diazabicyclooctane in 160 ml of anhydrous diethyl ether. Two hours' stirring at 0° to 5° C., filtering with suction and drying gives 29.1 g of the chloroethylurea of the formula

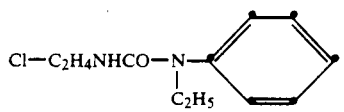

as a white powder of melting point 92°–93° C.

11.35 g thereof are refluxed with 6.5 g of N-ethylaniline in 50 ml of isopropanol in the presence of 5.5 g of fine sodium carbonate powder and 0.5 g of sodium iodide for 5 hours with stirring. The inorganic material is then separated off by filtration and washing, and the filtrate is stripped in vacuo of the solvent and then of unconverted ethylaniline to leave 11 g of the crude coupling component as a cloudy yellow oil which is used without purification.

EXAMPLE 2

Example 1 is repeated, except that the chloronitroaniline is replaced by an equivalent amount of 4-nitroaniline. The dye of the formula

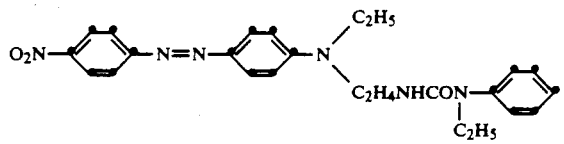

is obtained in similar yield and purity as a reddish brown powder of melting point 158°–160° C. The dye dyes polyester material in red shades.

EXAMPLE 3

Example 1 is repeated, except that the chloronitroaniline is replaced by an equivalent amount of 2,4-dinitroaniline (diazotized in sulfuric acid with nitrosylsulfuric acid). The dye

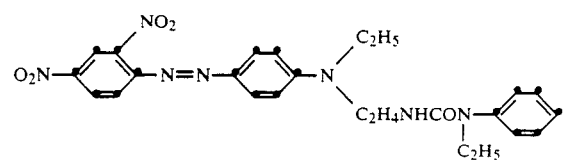

is obtained as greenish, metallically bright crystals of melting point 167°–168° C. The dye dyes polyester material in dull bluish red shades.

EXAMPLE 4

Example 1 is repeated, except that the ethylaniline is replaced by methylaniline. The chloroethylurea of the formula

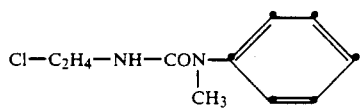

is obtained with a melting point of 72°–73° C.

The homologous coupling component prepared therefrom by reaction with ethylaniline as described is used to obtain the dye of the formula

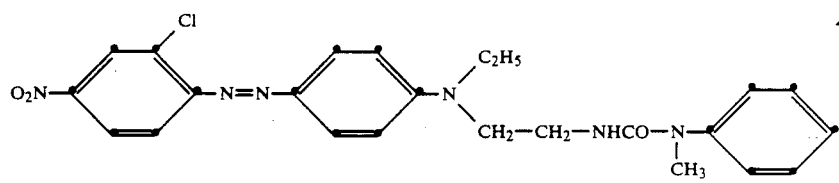

of melting point 196°–198° C. (sintering at 193°). The dye dyes polyester material in red shades.

Example 5: Example 1 is repeated, except that the ethylaniline is replaced by n-butylaniline. The chloroethylurea of the formula

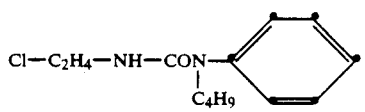

is obtained with a melting point of 61°–62° C.

The homologous coupling component prepared therefrom by reaction with ethylaniline as described is used to obtain the dye of the formula

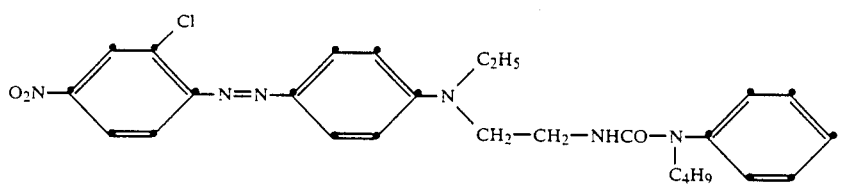

of melting point 155°–156° C. The dye dyes polyester material in red shades.

EXAMPLE 6

Reaction of the chloroethylurea as described in Example 1 with N-ethyl-3-aminoacetanilide gives a mixture of the latter with the coupling component of the formula

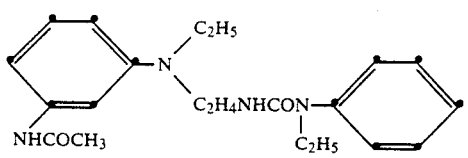

An amount of this mixture corresponding to about 0.01 mol is dissolved in 100 ml of sulfuric acid, the solution is admixed dropwise over 20 minutes at 0° to 5° C. with a diazonium salt solution prepared in conventional manner by diazotizing 2.6 g of 2,4-dinitro-6-bromoaniline with nitrosylsulfuric acid in sulfuric acid, the mixture is subsequently stirred for 2 hours, the precipitate is filtered off with suction and washed, and the 4.9 g of dye mixture obtained are dried and subjected to twofold column chromatography over silica gel using ethyl acetate as mobile phase to yield 1.1 g of the pure dye of the formula

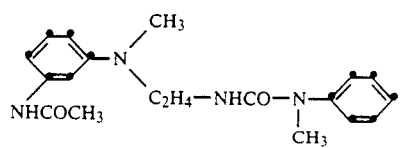

which is prepared in line with the directions in Example 6 and Example 1, is used, affording the dye of the formula

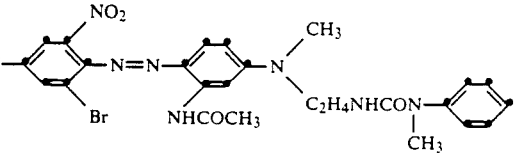

of melting point 190°–197° C. It dyes textile material made of polyester in violet-blue shades.

EXAMPLE 8

Reaction of 0.416 g of the dye of Example 6 in 40 ml of diethylene glycol monoethyl ether with an equivalent amount of CuNa(CN)$_2$ at 95°–100° C. for 30 minutes, precipitation with water, filtering off with suction, washing, drying and subsequent column chromatography gives about 0.7 g of the blue dye of the formula

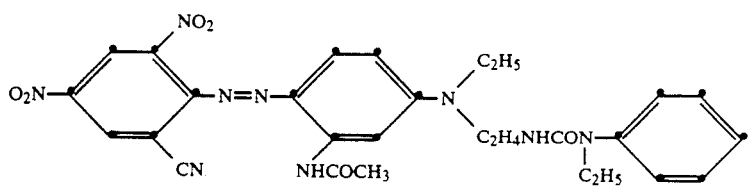

of melting point 108°–110° C. The dye dyes polyester material in blue shades.

EXAMPLE 9 a) Example 1 is repeated, except that the coupling component is replaced by an equivalent amount of the compound of the formula

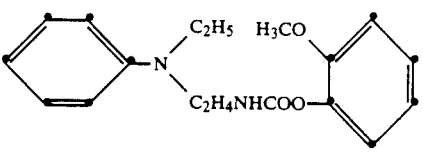

affording, in good yield, the dye of the formula

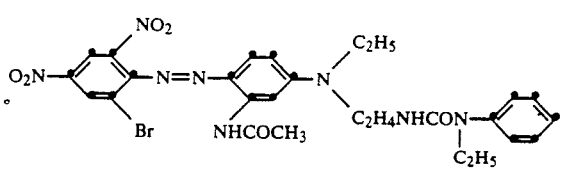

as green, metallically bright crystals of melting point 187°–188° C. The dye dyes polyester material in violet-blue shades.

EXAMPLE 7

Example 6 is repeated, except that the coupling component of the formula

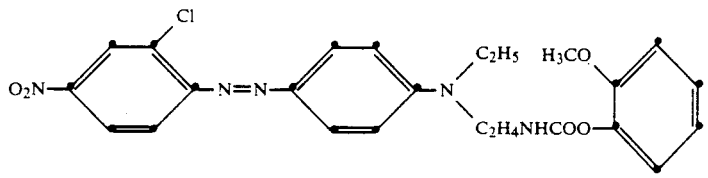

as a reddish brown powder of melting point 160°-162° C. The dye dyes polyester material in red shades.

b) The coupling component is prepared as follows: 12.4 g of guaiacol are reacted with 10.6 g of chloroethyl isocyanate in the presence of 0.1 g of diazabicyclooctane. An exothermic reaction ensues giving 21.7 g of the chloroethylurethane of the formula

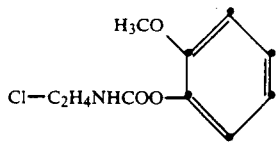

as beige, soft crystals of melting point 68°-71° C. 4.60 g of this chloroethylurethane are reacted with 2.42 g of N-ethylaniline at 100°-105° C. without solvent in the presence of 35 mg of sodium iodide over 16 hours. The reaction mixture is cooled down to 80° C., unconverted ethylaniline is acylated with 0.3 ml of acetic anhydride, and the crude coupling component obtained is used without purification.

EXAMPLES 10-12

Example 9 is repeated, except that the guaiacol in the synthesis of the coupling component is replaced by equivalent amounts of phenol, 4-methoxyphenol and 4-chlorophenol respectively. An otherwise identical procedure gives the dyes listed in the table below:

EXAMPLE 13

A solution of 2.8 g of 4-nitrobenzoyl chloride in 20 ml of toluene is added dropwise over 45 minutes to a cloudy solution of 2.0 g of trimethyleneurea and 2.4 g of triethylamine in 1000 ml of toluene stirring under reflux and is subsequently stirred in over 15 minutes. The white precipitate is filtered off with suction at room temperature, washed with toluene and then with water, and dried. The 3.2 g of the mononitrobenzoylurea obtained with a melting point of 205°-208° C. are hydrogenated in 40 ml of dimethylformamide by means of 0.32 g of 5 percent palladium carbon to give, on recrystallization from ethanol, 1.1 g of the compound of the formula

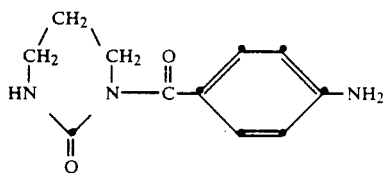

as a white powder melting at 210°-221° C. This powder is dissolved with 1.5 ml of 30 percent hydrochloric acid in 50 ml of water and diazotized with 1.25 ml of 4N sodium nitrite solution. The diazonium salt solution is added dropwise to a solution of 1.4 g of 3-diethylamino-4-methoxyacetanilide in 50 ml of 1N sulfuric acid which has been adjusted to pH 4-5. Subsequent stirring for two hours, filtering with suction, washing and drying gives 0.96 g of the dye of the formula

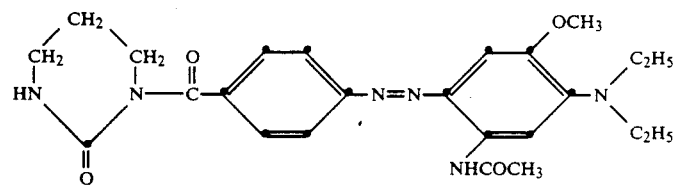

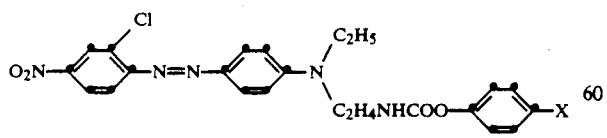

| Example | X | Melting point |
|---|---|---|
| 10 | H | 164-166° C. |
| 11 | OCH₃ | 164-166° C. (sintering at 162° C.) |
| 12 | Cl | 173-174° C. | as a red powder of melting point 186°-187° C. The dye dyes polyester material in red shades.

EXAMPLE 14

Example 13 is repeated, except that the coupling component is replaced by an equivalent amount of the corresponding pyridone, affording in very good yield and purity the yellow dye of the formula

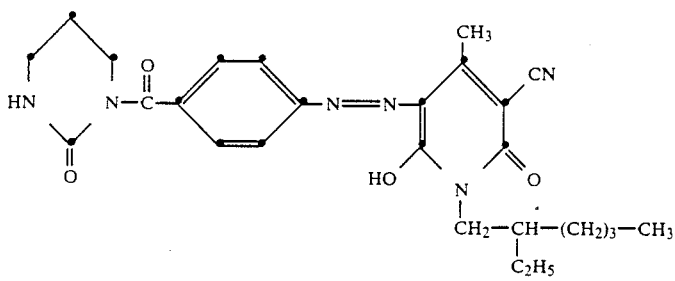

of melting point 225°–226° C.

EXAMPLE 15

3.11 g of the coupling component of Example 1 are reacted with 1.4 g of tetracyanoethylene in 7 ml of pyridine at 55° C. over 10 minutes. After cooling down to 5° C., 14 ml of glacial acetic acid are added, the reaction mixture is poured into 250 ml of ice-water, and the precipitated dye is filtered off with suction. Drying and subsequent chromatographic purification over silica gel with chloroform as mobile phase gives 1.6 g of the red dye of the formula

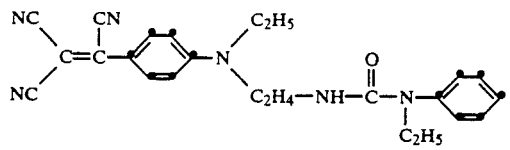

of melting point 162°–163° C.

EXAMPLE 16

Example 1 is repeated, except that the diazo component is replaced by an equivalent amount of a mixture of equal parts of 2-amino-5,6-dichlorobenzothiazole and 2-amino-4,5-dichlorobenzothiazole, affording in a similar yield a mixture of the dyes

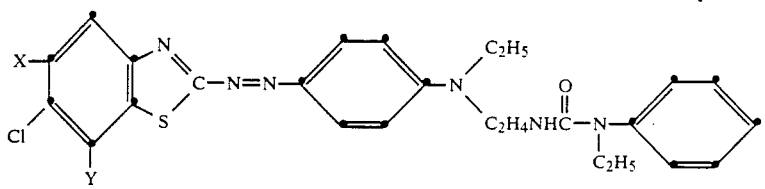

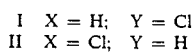

I  X = H;  Y = Cl
II X = Cl; Y = H as a greenish brown powder of melting point 100°–102° C. This produces red dyeings on polyester textile materials.

EXAMPLES 17 AND 18

Example 16 is repeated using the diazo components evident from the formulae below. The dyes listed in the table below are obtained.

| Example | Dye | Melting point |
|---|---|---|
| 17 | (reddish blue structure shown) | 170–172° C. |
| 18 | (greenish dark blue structure shown) | about 85° C. |

EXAMPLE 19

The dye of Example 4 is converted by sand milling with twice the amount of a commercially available dispersant of the dinaphthylmethanedisulfonate type into a 5 percent aqueous dispersion in a conventional manner. This formulation is used to prepare a dyeing of 1 percent strength, in respect of dye, on polyethylene terephthalate fabric in a conventional manner by the HT method at 130° C., and the dye is reduction cleared in a conventional manner. The deep red fabric is very rub- and wash-fast.

If, however, the fabric is heated to 160° C. for 45 seconds to test the thermomigration fastness, the rub fastness becomes very poor and in conventional wash tests at 60° C. it is in particular the cellulose acetate and polyamide adjacent fabrics which are very badly stained. This picture becomes considerably worse still if the fabric is finished before the thermomigration test with a textile softener of the distearyldiethylenetriamine type.

If, however, the dyed fabric is heated to 220° C. for 60 seconds before the reduction clear, the thermomigration test with or without softener has virtually no effect on the rub and wash fastness properties and only traces of the original dye are extractable from the fabric with boiling chloroform while a large proportion of the dye in the fibre resists even prolonged extraction attempts with dimethylformamide.

Similar results are obtained with the dyes of Examples 1, 5 and 9. Similar effects are also obtained with the dyes of Example 3 (dull bluish red) and Example 6 (violet-blue) and also Examples 2 and 16 (red).

EXAMPLE 20

A deep scarlet dyeing prepared in a conventional manner with the dye of Example 13 by padding and thermofixing at 210° C. proves very thermomigration-fast in the test described in Example 19.

The same is true of the dye of Example 15 if the thermofix takes place at 220° C.

EXAMPLE 21

Example 1 is repeated, except that the ethylaniline is replaced by aniline, affording the chloroethylurea of the formula

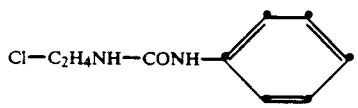

of melting point 121°–122° C., which is converted with ethylaniline into the coupling component

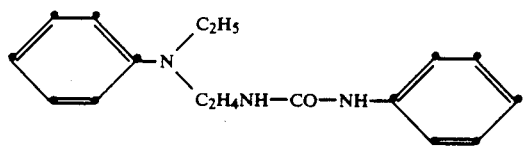

which is converted without isolation into the red dye of the formula

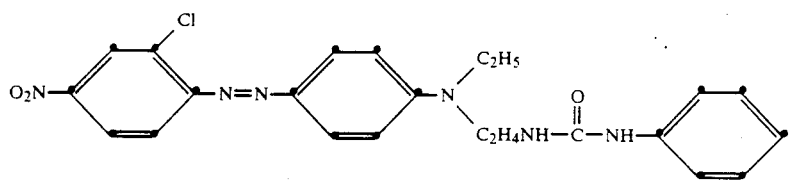

as described in Example 1. Brown powder of melting point 195°–196° C.

EXAMPLE 22

To a solution of 19.7 g (0.1 mol) of N-2-aminoethyl-N-ethylaniline (prepared by hydrolysis of phthalimidoethylethylaniline in aqueous hydrogen bromide) in 1000 ml of acetic acid is added dropwise in the course of 15 minutes at 7°–10° C. a conventionally prepared diazonium chloride solution of 17.3 g (0.1 mol) of 2-chloro-4-nitroaniline. After two hours' stirring, the violet-red suspension is filtered with suction, the filter residue is slurried in 400 ml of water, the slurry is brought to about pH 11 with 60 ml of 30 percent sodium hydroxide solution and filtered with suction, and the filter residue is washed and dried in a vacuum drying cabinet to leave 27.6 g (79.3% of the calculated amount) of the red dye of the formula

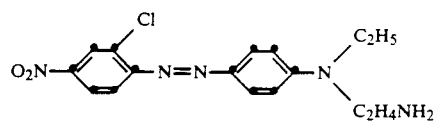

as a grey powder of melting point 133°–134° C.

17.4 g (0.05 mol) of this aminoethyl dye are dissolved in 200 ml of dichloromethane and 5.5 g of triethylamine (0.055 mol) are added, followed by the dropwise addition in the course of 20 minutes at a maximum temperature of 25° C. of a solution of the crude chloroformic ester prepared by phosgenation of 0.055 mol of 2-methylphenol in toluene (about 10% excess). After half an hour the reaction solution is extracted first with water, then with dilute hydrochloric acid and finally again with water. Evaporation of the dichloromethane layer, washing of the residue with isopropanol and drying gives 20.9 g (93.6% of theory) of the dye of the formula

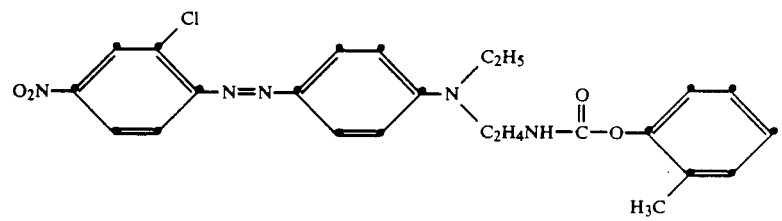

as a brown powder of melting point 145°–146° C.

EXAMPLE 23

Example 22 is repeated, except that the chloroformic ester of 2-methylphenol is replaced by an equivalent amount of the crude carbamoyl chloride of diisopropylamine, affording under otherwise identical conditions the dye of the formula

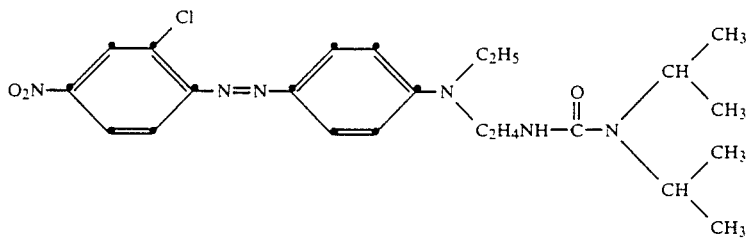

of melting point 172°-174° C.

EXAMPLE 24

Example 22 is repeated, except that the chloroformic ester of 2-methylphenol is replaced by an equivalent amount of the carbamoyl chloride of diethylamine, affording under otherwise identical conditions the dye of the formula

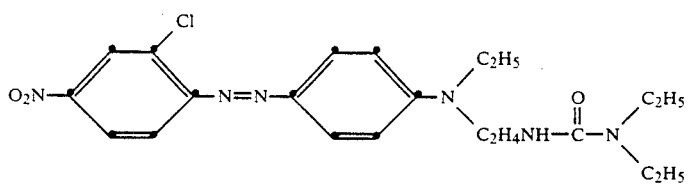

of melting point 158°-160° C.

EXAMPLE 25

Example 22 is repeated, except that the chloroformic ester of 2-methylphenol is replaced by an equivalent amount of butyl isocyanate, affording under otherwise identical conditions the dye of the formula

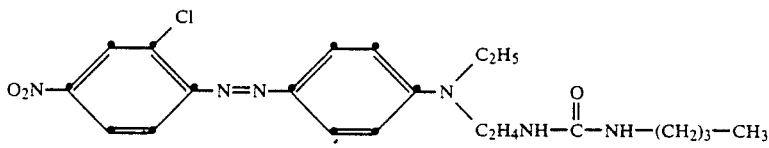

of melting point 166°-168° C.

EXAMPLE 26

The method of Example 25 also gives the dye of the formula

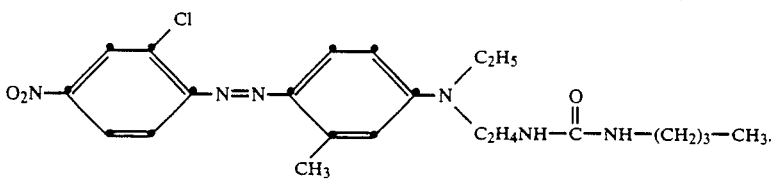

EXAMPLE 27

21.5 g (0.093 mol) of 3-N-cyanoethyl-N-ethylaminoacetanilide are hydrogenated in 100 ml of anhydrous ethanol and 30 g of liquid ammonia in the presence of 4.3 g of Raney nickel at 70°-75° C. under an initial pressure of 150 bar of hydrogen. After 1.5 hours, the consumption of hydrogen ceases. The catalyst is filtered off and the solution is evaporated, giving 22.5 g (approximately the calculated amount) of the crude compound of the formula

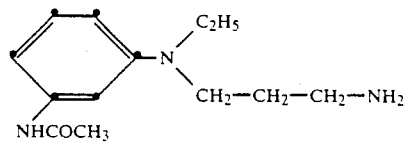

as a highly viscous brown oil.

5.7 g (about 0.024 mol) of this crude coupling component are then made to react in 200 ml of 2N sulfuric acid with the diazonium chloride solution prepared from 3.45 g (0.02 mol) of 2-chloro-4-nitroaniline at 0°-10° C. over 2 hours. The brown dye is then filtered off, washed with 2N sulfuric acid and slurried in 200 ml of water, and the slurry is brought to pH 10 with sodium hydroxide. Further filtering with suction, washing with water and drying gives 5.8 g (69% of theory) as a greenish brown, chromatographically nonuniform powder of melting point 144°-147° C. (sintering at 105° C.), which consists chiefly of the dye of the formula

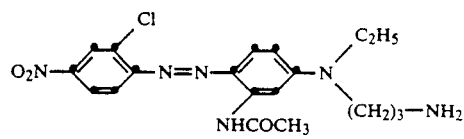

2.1 g (0.05 mol) thereof are dissolved in 20 ml of dichloromethane, and 0.76 ml (approximately 10% excess) of triethylamine are added, followed over 10 minutes at 22°–25° C. by the addition of the crude chloroformic ester of 0.55 mol of 2-methylphenol. After subsequent stirring for one hour, the starting material is no longer detectable in the thin-layer chromatogram. The mixture is purified by recrystallization from isopropanol, obtaining in this way 2.0 g of the dye of the formula -continued

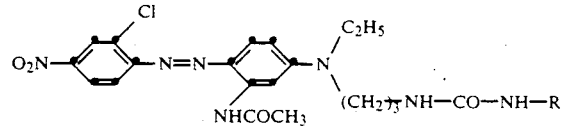

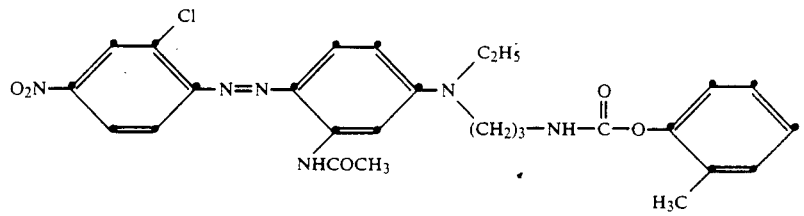

as a brown powder of melting point 167°–168° C., the nuclear magnetic resonance spectrum of which confirms the structure.

| Example | R | Melting point |
|---|---|---|
| 30 | —$(CH_2)_3$—$CH_3$ | 210–211° C. |

EXAMPLE 28

2.1 g of the dye of the formula

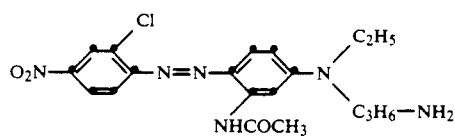

prepared as described in Example 27 are admixed at −5° to −8° C. in 20 ml of dichloromethane dropwise with 3 ml of cyclohexyl isocyanate, and the mixture is then stirred at reflux temperature for 30 minutes. The precipitated dye crystals of the formula

EXAMPLES 31 and 32

The coupling component of the formula

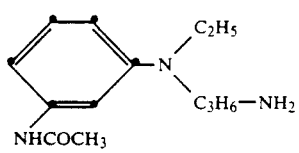

described in Example 27 is converted by the method described in Example 27 by reaction with the corresponding diazonium salts and subsequent reaction with

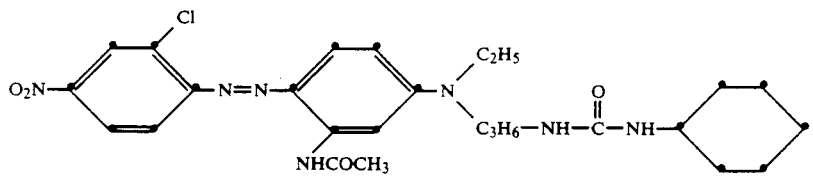

are then filtered off with suction at room temperature, washed with dichloromethane and dried. Melting point 215°–217° C.

EXAMPLE 29 and 30

The method of Example 28 gives on using equivalent amounts of isopropyl isocyanate and n-butyl isocyanate respectively, instead of cyclohexyl isocyanate, the dyes of the formula 2-methylphenyl chloroformates and n-butyl isocyanate respectively into the dyes of the formulae

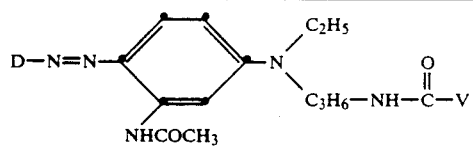

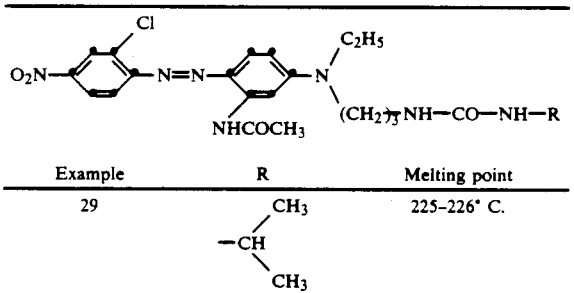

| Example | R | Melting point |
|---|---|---|
| 29 | —CH(CH$_3$)$_2$ (—CH with CH$_3$/CH$_3$) | 225–226° C. |

| Example | D | V | Melting point |
|---|---|---|---|
| 31 | 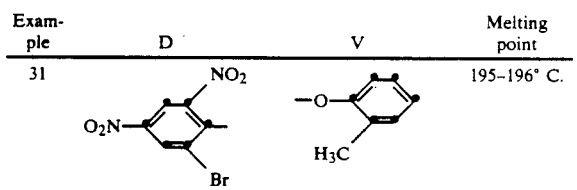 NO$_2$ / O$_2$N / Br | —O—(phenyl with H$_3$C) | 195–196° C. |

-continued

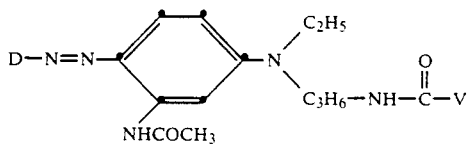

| Example | D | V | Melting point |
|---|---|---|---|
| 32 |  | NH—(CH$_2$)$_3$—CH$_3$ | 157–158° C. |

EXAMPLE 33

1.2 g of the dye of Example 32 are reacted in 6 ml of pyridine and 1.3 ml of water with 0.2 g of CuCN at 65°–70° C. for 3 hours. The resulting dye is then precipitated with water, prepurified by recrystallization from isopropanol and finally further purified over a silica gel column using ethyl acetate as mobile phase. The blue dye of the formula

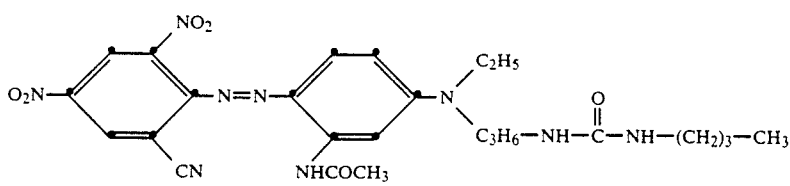

is obtained as a brown powder of melting point 232°–234° C. The nuclear magnetic resonance spectrum confirms this structure.

EXAMPLE 34

86 g of the cyanoethylation product of the formula

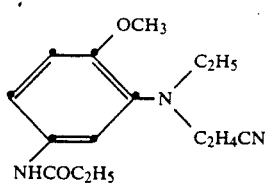

are hydrogenated in 280 ml of anhydrous ethanol and 87 g of liquid ammonia in the presence of 12.6 g of Raney nickel at 70°–75° C. under an initial pressure of 150 bar of hydrogen. After 5½ hours the consumption of hydrogen ceases. The catalyst is filtered off and the solution is evaporated to leave 85 g of a viscous yellowish brown crude product. 52 g thereof are dissolved in 500 ml of 1N HCl, the solution is brought to pH 6.5–7 with sodium hydroxide, and impurities are removed by extraction with ethyl acetate. The aqueous phase can be made to yield 33 g of the amine of the formula

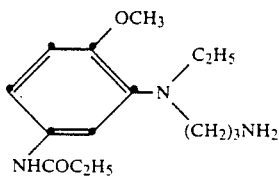

by extraction with butanol at pH 11.5 and evaporation of butanol extracts.

6.2 g of the amine are dissolved in 20 ml of ethanol, and the solution is added to 200 ml of 1N sulfuric acid. 30 per cent sodium hydroxide is then added to adjust to pH 2–3, and the diazo solution of 0.02 mol of 2-bromo-4,6-dinitroaniline is added at 0°–5° C. in the course of 30 minutes while the pH of 2–3 is maintained with sodium hydroxide. 30 minutes' further reaction, adjustment to pH 11.5, filtering off with suction, washing and drying gives 8.3 g of the dye of the formula

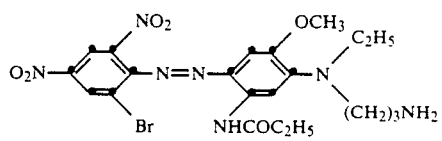

as a greyish brown powder of melting point 139°–141° C. with 2.8 g thereof in 20 ml of dimethylformamide are then admixed at 0°–5° C. with 2 ml of butyl isocyanate. Warming to room temperature, precipitating with 80 ml of water, filtering off with suction, washing with water and isopropanol and drying gives 2.5 g of the blue dye of the formula

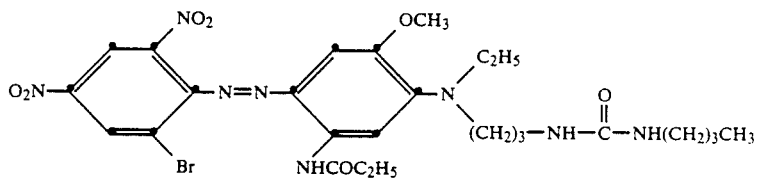

as a brown powder of melting point 115°–117° C. The structure is confirmed by nuclear magnetic resonance spectroscopy.

EXAMPLE 35

20.0 g of N,N'-trimethyleneurea are partially dissolved in 1000 ml of toluene under reflux and admixed with 20.2 g of triethylamine and then dropwise, in the course of 90 minutes, with a solution of 25.4 g of 3-chloropropionyl chloride. Subsequent stirring for 30 minutes, cooling down to 5° C., removal of undissolved matter by filtration and evaporating the filtrate in vacuo gives 24 g of chloropropionylurea of the formula

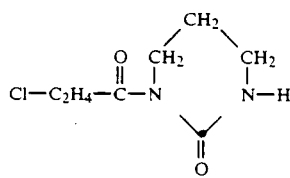

as a beige powder.

5.71 g thereof are reacted in 30 ml of isopropanol in the presence of 0.30 g of sodium iodide and 3.18 g of sodium carbonate powder with 7.26 g of N-ethylaniline in the course of 17 hours under reflux. Filtration of the mixture and removal of the solvent and excess ethylaniline by vacuum distillation gives 7.1 g of the coupling component of the formula

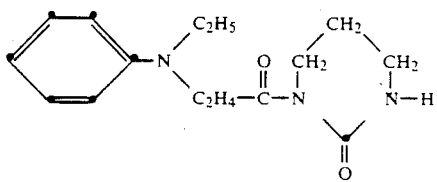

as a viscous oil.

Coupling it with diazotized 2-chloro-4-nitroaniline in acetic acid gives the crude dye of the formula

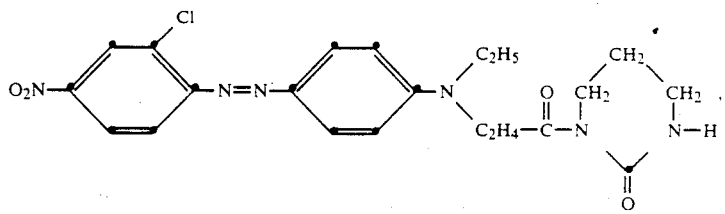

which, following chromatographic purification over silica gel with ethyl acetate as mobile phase, has a melting point of 197°–199° C. and the proton magnetic resonance spectrum of which in dimethyl sulfoxide confirms the above structure.

EXAMPLES 36–47

The method described in Examples 22–32 is used to prepare the dyes listed in the table below by reacting a dye containing an aminoalkylene group with a chloroformic ester, a carbamoyl chloride of an amine or an isocyanate.

| Ex. | Dye | Hue on polyester |
|---|---|---|
| 36 | $O_2N$—⟨phenyl(CN)⟩—N=N—⟨pyridine ring with $H_3C$, CN, $NHC_2H_5$⟩—NH—$CH_2$—$CH_2$—NHCONH—$C_4H_9$ | Red |
| 37 | $O_2N$—⟨phenyl(CN)⟩—N=N—⟨pyridine ring with $H_3C$, CN, NH—$CH_2$—$CH_2$—NHCONH—$C_2H_5$⟩—$NHC_2H_5$ | Red |
| 38 | $O_2N$—⟨phenyl(CN)⟩—N=N—⟨pyridine ring with $H_3C$, CN, $NHC_2H_5$, $NHC_2H_4NH$—CO—O—⟨phenyl-$OCH_3$⟩⟩ | Red |

-continued

| Ex. | Dye | Hue on polyester |
|---|---|---|
| 39 | | Red |
| 40 | | Blue |
| 41 | | Yellow |
| 42 | | Yellow |
| 43 | | Red |
| 44 | | Red |
| 45 | | Yellow |

| Ex. | Dye | Hue on polyester |
|---|---|---|
| 46 | | Yellow |
| 47 | | Bluish red |

EXAMPLE 48

A diazonium chloride solution prepared in a conventional manner from 6.9 g of 2-chloro-4-nitroaniline is added dropwise over 30 minutes at 0°–5° C. to a solution of 11.7 g of the coupling component of the formula

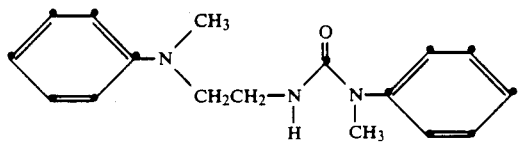

in 100 ml of glacial acetic acid. After subsequent stirring for two hours at 0°–5° C., 400 ml of ice-water are added. Filtering off with suction, washing and drying gives 13.3 g of the dye of the formula

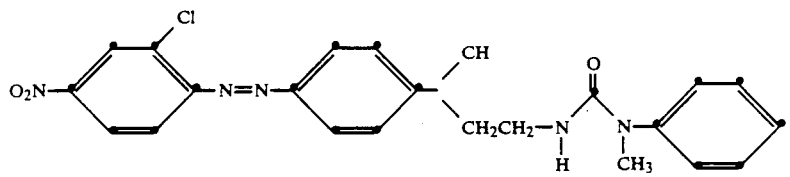

as a black powder of melting point 188°–192° C. The dye dyes polyester material in red shades.

The coupling component used is prepared as follows:

26.8 g of N-methylaniline are stirred at 20° C. in 120 ml of toluene, and 26.4 g of chloroethyl isocyanate are added dropwise. Two hours' subsequent stirring, filtering off with suction, washing and drying gives 11.7 g of chloroethylurea of the formula

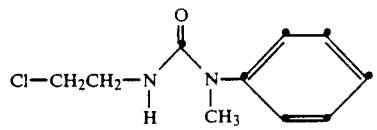

as white crystals of melting point 72°–73° C. Concentrating the mother liquor and filtering off with suction gives a further 24.6 g of this substance.

10.6 g of chloroethylurea, 5.7 g of N-methylaniline, 0.8 g of potassium iodide and 7.2 g of potassium carbonate are refluxed in 50 ml of toluene for 20 hours. Cooling down and the addition of 8 g of succinic anhydride is followed by stirring at 20° C. overnight. Thereafter the mixture is extracted with 30 ml each of 1M sodium bicarbonate solution and water. The organic phase is concentrated to give 12 g of coupling component as a viscous oil. Adding 25 ml of tert-butyl methyl ether, standing, decanting and drying gives 4.7 g of the coupling component as white crystals of melting point 89°–90° C.

EXAMPLE 49

The method of Example 48 is used to give a dye of the formula

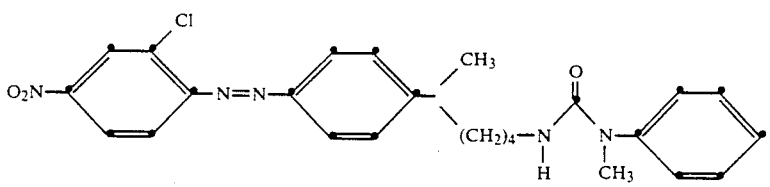

as a black powder of melting point 122°–124° C. if the coupling component used is a substance of the formula

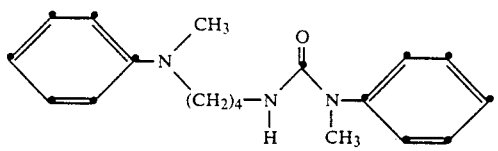

The dye dyes polyester material in red shades.

To prepare the coupling component, 7.1 g of bromobutyl isocyanate are added dropwise to 8.6 g of N-methylaniline and 5 g of sodium carbonate in 30 ml of dimethylformamide. After 6 hours' stirring at 80° C., 2 g of succinic anhydride are added. The solution is poured onto 100 ml of glacial acetic acid and used in that state for coupling.

EXAMPLE 50

A diazonium salt solution prepared in a conventional manner from 5.5 g of 4-nitroaniline is added dropwise at 0°–5° C. to a solution of the coupling component of the formula

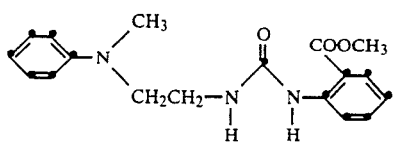

in 200 ml of glacial acetic acid. Following two hours' subsequent stirring, 400 ml of water are added. Filtering off with suction, washing and drying gives 5.3 g of crude product which, for purification, is precipitated three times from 15 ml of hot tert-butyl methyl ether each time. 1.9 g are obtained of pure dye of the formula

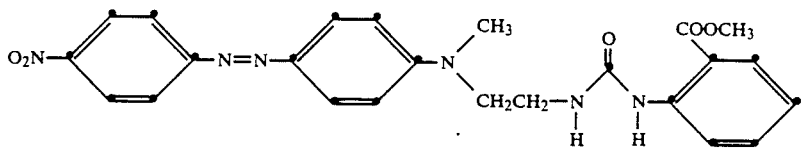

as a dark red powder of melting point 160°–161° C. The dye dyes polyester material in red shades.

The coupling component used is prepared as follows:
6.2 g of chloroethyl isocyanate are added dropwise to 9.1 g of methyl anthranilate is 50 ml of toluene. Following two hours' subsequent stirring at room temperature, 6.4 g of N-methylaniline, 8.3 g of potassium carbonate and 0.5 g of potassium iodide are added. After 8 hours under reflux, the insoluble salts are filtered off with suction. The filtrate is extracted with 1M hydrochloric acid solution, 1 M sodium bicarbonate solution, and with water. The solvent is distilled off to leave 12.7 g of crude coupling component as a yellowish oil. The crude product is used in that state for coupling.

EXAMPLE 51

0.7 g of the sodium salt of 1,4-diamino-3-cyano-2-tetrazolyl-anthraquinone and 0.1 g of potassium iodide are suspended in 5 ml of dimethylformamide. A solution of 0.5 g of the chloroethylurea described in Example 48, in 5 ml of dimethylformamide, is added dropwise at 80° C. in the course of 10 minutes. After 6 hours' stirring at 80° C., the dye is precipitated at 0°–5° C. by addition of 50 ml of methanol. Filtering off with suction, washing and drying gives 0.8 g of substance of the formula

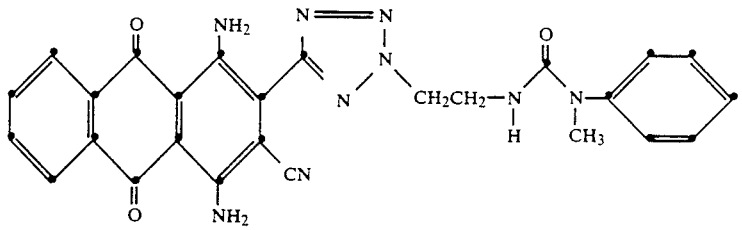

as a dark blue powder of melting point 129°–130° C. The dye dyes polyester material in blue shades.

EXAMPLE 52

11.1 g of N-methylaniline are added dropwise at 0°–5° C. to 18 g of toluylene 2,4-diisocyanate in 50 ml of toluene. Following 2 hours' stirring at 0°–5° C., the solvent is distilled off leaving 61.5 g of crude monoisocyanate of the formula

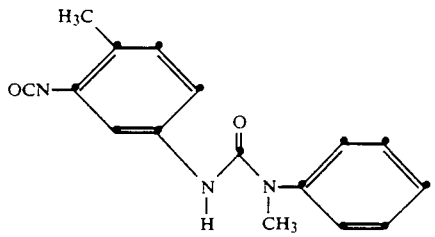

as a yellowish oil having an isocyanate titre of 6.9%. On standing for several days, white crystals form with a melting point of 81°–82° C.

5.9 g of the dye of the formula

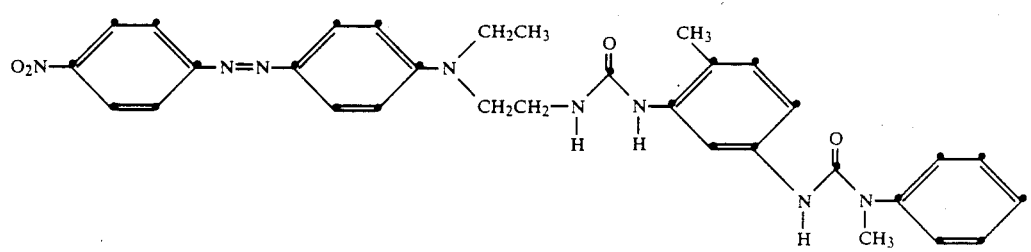

in 50 ml of dimethylformamide are admixed with 12.7 g of the above-described monoisocyanate (crude product) and 0.2 g of diazabicyclooctane. The mixture is stirred at 80° C. for 8 hours, cooled down and poured onto 700 ml of ice-water. The extraction with 150 ml of methylene chloride and subsequent washing and concentrating of the organic phase gives 10.1 g of a black amorphous residue which contains the dye of the formula

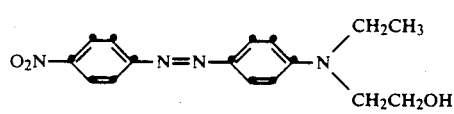

as main product. Recrystallization from methanol gives 0.95 g of red crystals of melting point 95°–98° C. The dye dyes polyester material in red shades.

EXAMPLE 53

A diazonium chloride solution prepared in a conventional manner from 1.4 g of 4-nitroaniline is added dropwise at 0°–5° C. to a solution of 4.5 g of coupling component of the formula

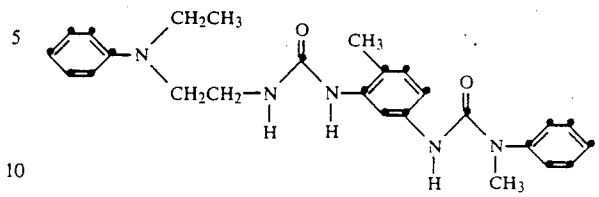

in 20 ml of glacial acetic acid. Following two hours' subsequent stirring, 150 ml of ice-water are added. Filtering off with suction, washing and drying gives 4.5 g of the dye of the formula

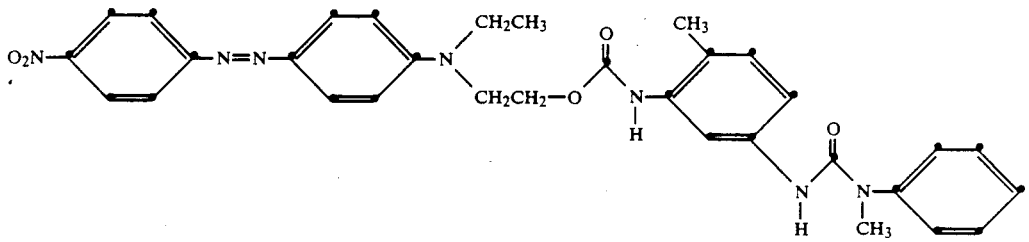

as a black powder. Recrystallization from methanol gives red crystals of melting point 147°–152° C. The dye dyes polyester material in brownish red shades.

The coupling component is prepared as follows:

4.9 g of N-(β-aminoethyl)-N-ethylaniline are added a little at a time to 20 g of the monoisocyanate described in Example 52 in 20 ml of toluene. Subsequent stirring for two hours, filtering off with suction, washing and drying gives 10.5 g of coupling component as a yellowish powder of melting point 104°–110° C.

EXAMPLES 54–59

The method described in Examples 52 and 53 is used to prepare the dyes listed in the table below by using the corresponding diisocyanates, amines and hydroxyethyl- or β-aminoethyl-substituted dyes or coupling and diazo components.

| Ex. | Dye | Hue on polyester |
|---|---|---|
| 54 | O₂N—⟨Cl⟩—N=N—⟨⟩—N(C₂H₅)(CH₂CH₂—O—C(=O)—NH—⟨⟩—CH₃ with NH—C(=O)—N(CH₃)—⟨⟩) | Red |
| 55 | O₂N—⟨⟩—N=N—⟨⟩—N(C₂H₅)(CH₂CH₂—O—C(=O)—NH—CH₂—[2,2,4,4-tetramethylcyclohexyl]—NH—C(=O)—NH-n-Butyl) | Red |
| 56 | O₂N—⟨CN⟩—N=N—⟨⟩—N(C₂H₅)(CH₂CH₂—O—C(=O)—NH—[tetramethylcyclohexyl]—CH₂—NH—C(=O)—NH-n-Butyl) | Violet |
| 57 | O₂N—⟨⟩—N=N—⟨⟩—N(C₂H₅)(CH₂CH₂—O—C(=O)—NH—(CH₂)₆—NH—C(=O)—N(CH₃)—⟨⟩) | Red |
| 58 | O₂N—⟨Cl⟩—N=N—⟨⟩—N(C₂H₅)(CH₂CH₂—NH—C(=O)—NH—CH₂—[tetramethylcyclohexyl]—NH—C(=O)—NH-n-Butyl) | Red |
| 59 | O₂N—⟨⟩—N=N—⟨⟩—N(C₂H₅)(CH₂CH₂—O—C(=O)—NH—⟨⟩—NH—C(=O)—N(CH₃)—⟨⟩) | Red |

Example 60-111

The method described in Examples 1-12 and 22-32 is used to prepare the dyes listed in the table below.

$$D-N=N-\underset{\underset{X_1}{\bigcirc}}{\overset{Y_1}{\bigcirc}}-N\underset{B_1-NH-\overset{O}{\overset{\|}{C}}-V}{\overset{R_5}{\diagdown}}$$

| Ex. | D | $X_1$ | $Y_1$ | $B_1$ | V | $R_5$ | Hue on polyester |
|---|---|---|---|---|---|---|---|
| 60 | H₃C–C(COOCH₃)=C(COOCH₃)–C(CH₃)=... S (thiophene with COOCH₃, COOCH₃, CH₃, CH₃) | –NH–CO–CH₃ | H | –(CH₂)₃– | –NH-n-Butyl | C₂H₅ | Reddish violet |
| 61 | Benzothiazole, Cl(5,6 + 6,7-Dichloro) | –NH–CO–CH₃ | H | –(CH₂)₃– | –NH-n-Butyl | C₂H₅ | Ruby |
| 62 | Benzothiazole, Cl(5,6 + 6,7-Dichloro) | –NH–CO–C₂H₅ | H | –(CH₂)₃– | –NH-n-Butyl | C₂H₅ | Ruby |
| 63 | Benzothiazole, Cl(5,6 + 6,7-Dichloro) | –NH–CO–C₂H₅ | H | –(CH₂)₃– | –NH-i-Propyl | C₂H₅ | Ruby |
| 64 | Benzothiazole, Cl(5,6 + 6,7-Dichloro) | –NH–CO–C₂H₅ | H | –(CH₂)₂– | –NH–C₂H₅ | C₂H₅ | Ruby |

Example 60-111-continued

The method described in Examples 1-12 and 22-32 is used to prepare the dyes listed in the table below.

Structure:

$$D-N=N-\underset{X_1}{\underset{|}{\overset{Y_1}{\underset{|}{C_6H_3}}}}-N(R_5)-B_1-NH-C(=O)-V$$

| Ex. | D | $X_1$ | $Y_1$ | $B_1$ | V | $R_5$ | Hue on polyester |
|---|---|---|---|---|---|---|---|
| 65 | Benzothiazol-2-yl, Cl(5,6 + 6,7-Dichloro) | —NH—C(=O)—C$_2$H$_5$ | H | —(CH$_2$)$_2$— | —NH-n-Butyl | C$_2$H$_5$ | Ruby |
| 66 | Benzothiazol-2-yl, Cl(5,6 + 6,7-Dichloro) | —NH—C(=O)—C$_2$H$_5$ | H | —(CH$_2$)$_3$— | 2-methoxyphenyl | C$_2$H$_5$ | Ruby |
| 67 | 5-Ethylthio-1,3,4-thiadiazol-2-yl | —NHCOCH$_3$ | H | —(CH$_2$)$_3$— | 2-methoxyphenyl | C$_2$H$_5$ | Red |
| 68 | 5-Ethylthio-1,3,4-thiadiazol-2-yl | —NHCOCH$_3$ | H | —(CH$_2$)$_3$— | —NH-i-Propyl | C$_2$H$_5$ | Red |
| 69 | 5-Ethylthio-1,3,4-thiadiazol-2-yl | —NHCOC$_2$H$_5$ | H | —(CH$_2$)$_3$— | —NH—C$_2$H$_5$ | C$_2$H$_5$ | Red |

Example 60–111-continued

The method described in Examples 1-12 and 22-32 is used to prepare the dyes listed in the table below.

$$D-N=N-\underset{X_1}{\underset{|}{\bigcirc}}-\underset{Y_1}{\overset{R_5}{\underset{|}{N}}}-B_1-NH-\overset{O}{\underset{|}{C}}-V$$

| Ex. | D | $X_1$ | $Y_1$ | $B_1$ | V | $R_5$ | Hue on polyester |
|---|---|---|---|---|---|---|---|
| 70 | $H_5C_2-S\underset{N}{\overset{N}{\diagup}}\diagdown_S\diagdown$ | $-NHCOC_2H_5$ | H | $-(CH_2)_3-$ | $-NH-C_2H_5$ | $CH_3$ | Red |
| 71 | $H_5C_2-S\underset{N}{\overset{N}{\diagup}}\diagdown_S\diagdown$ | $-NHCOC_2H_5$ | H | $-(CH_2)_3-$ | $-NH-C_2H_5$ | n-Propyl | Red |
| 72 | $H_5C_2-S\underset{N}{\overset{N}{\diagup}}\diagdown_S\diagdown$ | $-NHCOC_2H_5$ | H | $-(CH_2)_3-$ | $-NH-C_2H_5$ | n-Butyl | Red |
| 73 | $\underset{NC}{\overset{NC}{\diagdown}}C=C\underset{N-CH_2-CN}{\overset{N}{\diagup}}$ | $CH_3$ | H | $-(CH_2)_3-$ | 4-Cl-C$_6$H$_4$-O- | n-Butyl | Red |
| 74 | $\underset{NC}{\overset{NC}{\diagdown}}C=C\underset{N-CH_2-CN}{\overset{N}{\diagup}}$ | $CH_3$ | H | $-(CH_2)_3-$ | 4-OCH$_3$-C$_6$H$_4$-O- | n-Butyl | Red |

Example 60-111-continued

The method described in Examples 1-12 and 22-32 is used to prepare the dyes listed in the table below.

$$D-N=N-\underset{X_1}{\overset{Y_1}{\underset{|}{\bigcirc}}}-N\underset{B_1-NH-\overset{O}{\overset{\|}{C}}-V}{\overset{R_5}{\diagdown}}$$

| Ex. | D | $X_1$ | $Y_1$ | $B_1$ | V | $R_5$ | Hue on polyester |
|---|---|---|---|---|---|---|---|
| 75 | (pyrazole with NC, NC, CH₂—CN, isopropylidene) | CH₃ | H | —(CH₂)₃— | —NH—(phenyl) | n-Butyl | Red |
| 76 | (phenyl with Br, Br, H₃C) | —NHCOCH₃ | H | —(CH₂)₃— | —NH-n-Butyl | C₂H₅ | Yellow |
| 77 | (phenyl with CN, CN, H₃C) | —NHCOCH₃ | H | —(CH₂)₃— | —NH-i-Propyl | C₂H₅ | Red |
| 78 | (phenyl with CN, CN, H₃C) | —NH—SO₂CH₃ | H | —(CH₂)₃— | —NH-n-Butyl | n-Butyl | Red |

Example 60-111-continued

The method described in Examples 1-12 and 22-32 is used to prepare the dyes listed in the table below.

$$D-N=N-\underset{\underset{X_1}{\overset{Y_1}{\bigcirc}}}{\bigcirc}-N\underset{B_1-NH-\overset{O}{\overset{\|}{C}}-V}{\overset{R_5}{\diagdown}}$$

| Ex. | D | $X_1$ | $Y_1$ | $B_1$ | V | $R_5$ | Hue on polyester |
|---|---|---|---|---|---|---|---|
| 79 | 2,4-(O$_2$N,CN), 6-CN phenyl | —CH$_3$ | H | —(CH$_2$)$_3$— | —NH-n-Butyl | C$_2$H$_5$ | Reddish blue |
| 80 | 2,4-(O$_2$N,NO$_2$), 6-Cl phenyl | —CH$_3$ | —OCH$_3$ | —(CH$_2$)$_3$— | —NH-n-Butyl | C$_2$H$_5$ | Blue |
| 81 | 2,4,6-trinitrophenyl | —NHCOCH$_3$ | H | —(CH$_2$)$_3$— | —NH-n-Butyl | C$_2$H$_5$ | Blue |
| 82 | 2,4,6-trinitrophenyl | —NHCOCH$_3$ | —OCH$_3$ | —(CH$_2$)$_3$— | —NH-n-Butyl | C$_2$H$_5$ | Greenish blue |

Example 60-111-continued
The method described in Examples 1-12 and 22-32 is used to prepare the dyes listed in the table below.
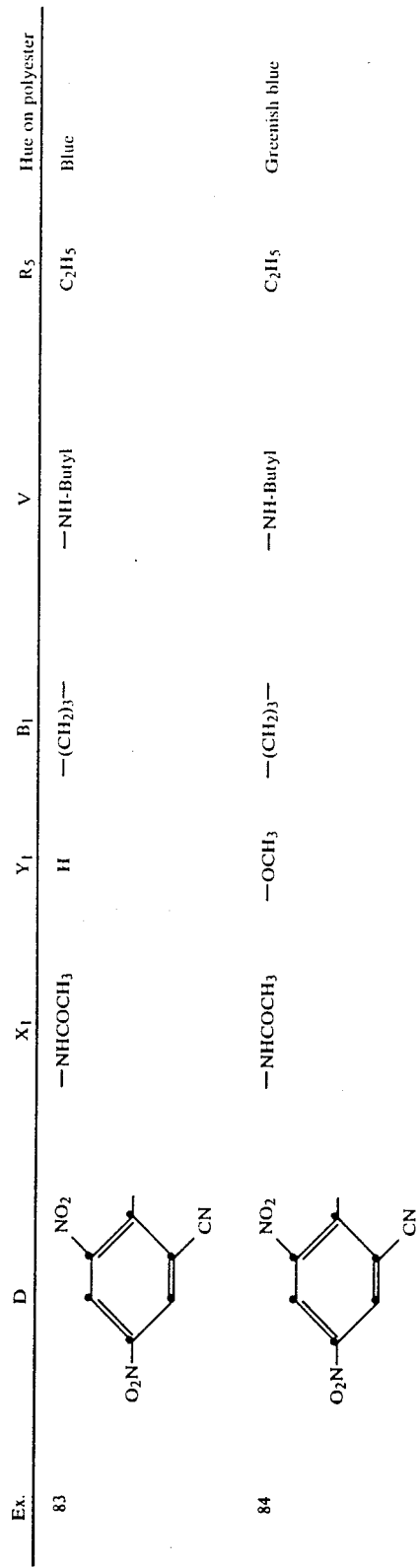
| Ex. | D | $X_1$ | $Y_1$ | $B_1$ | V | $R_5$ | Hue on polyester |
|---|---|---|---|---|---|---|---|
| 83 | 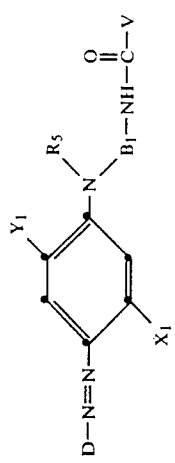 | —NHCOCH$_3$ | H | —(CH$_2$)$_3$— | —NH-Butyl | C$_2$H$_5$ | Blue |
| 84 | | —NHCOCH$_3$ | —OCH$_3$ | —(CH$_2$)$_3$— | —NH-Butyl | C$_2$H$_5$ | Greenish blue |
| 85 | | —NHCOCH$_3$ | H | —(CH$_2$)$_3$— | —NH-Butyl | C$_2$H$_5$ | Reddish blue |
| 86 | | —NH—COC$_2$H$_5$ | H | —(CH$_2$)$_3$— | —NH-Butyl | C$_2$H$_5$ | Reddish blue |

Example 60–111-continued

The method described in Examples 1–12 and 22–32 is used to prepare the dyes listed in the table below.

D—N=N—[phenyl with Y₁, X₁]—N(R₅)—B₁—NH—C(=O)—V

| Ex. | D | X₁ | Y₁ | B₁ | V | R₅ | Hue on polyester |
|---|---|---|---|---|---|---|---|
| 87 | O₂N—[phenyl]—CN | —NH—COC₂H₅ | H | —(CH₂)₃— | —NH-i-Propyl | CH₃ | Ruby |
| 88 | O₂N—[phenyl]—CN | —NHCOCH₃ | H | —(CH₂)₂— | —NH—C₂H₅ | C₂H₅ | Ruby |
| 89 | O₂N—[phenyl]—Cl (Cl) | Cl | H | —(CH₂)₃— | —NH-Butyl | C₂H₅ | Yellowish brown |
| 90 | O₂N—[phenyl]—SO₂CH₃ | H | H | —(CH₂)₃— | —NH-Butyl | C₂H₅ | Ruby |
| 91 | O₂N—[thiophene]— | —NHCOCH₃ | H | —(CH₂)₃— | —NH-Butyl | C₂H₅ | Green |

Example 60-111-continued

The method described in Examples 1–12 and 22–32 is used to prepare the dyes listed in the table below.

$$D-N=N-\underset{X_1}{\underset{|}{\overset{Y_1}{\overset{|}{\bigcirc}}}}-N\underset{B_1-NH-\overset{O}{\overset{\|}{C}}-V}{\overset{R_5}{\diagup}}$$

| Ex. | D | $X_1$ | $Y_1$ | $B_1$ | V | $R_5$ | Hue on polyester |
|---|---|---|---|---|---|---|---|
| 92 | ![thiazole with NO2, COCH3] | —NHCOCH$_3$ | H | —(CH$_2$)$_3$— | —NH-Butyl | C$_2$H$_5$ | Blue |
| 93 | 2-CN, 4-NO$_2$, 6-CF$_3$ phenyl | —NHCOCH$_3$ | OCH$_3$ | —(CH$_2$)$_3$— | —NH-Butyl | C$_2$H$_5$ | Blue |
| 94 | 2-Cl, 4-NO$_2$ phenyl | H | H | —(CH$_2$)$_3$— | —NH-Butyl | C$_2$H$_5$ | Red |
| 95 | 2-Cl, 4-NO$_2$ phenyl | H | H | —(CH$_2$)$_4$— | —O—C$_6$H$_4$—OCH$_3$ | C$_2$H$_5$ | Red |
| 96 | 2-Cl, 4-NO$_2$ phenyl | H | H | —(CH$_2$)$_4$— | —NH-Butyl | C$_2$H$_5$ | Red |

Example 60-111-continued

The method described in Examples 1-12 and 22-32 is used to prepare the dyes listed in the table below.

| Ex. | D | $X_1$ | $Y_1$ | $B_1$ | V | $R_5$ | Hue on polyester |
|---|---|---|---|---|---|---|---|
| 97 | 2,4-dinitrophenyl (NO$_2$, O$_2$N) | H | H | —(CH$_2$)$_4$— | —NH-Butyl | C$_2$H$_5$ | Ruby |
| 98 | 6-nitrobenzothiazol-2-yl | H | H | —(CH$_2$)$_4$— | —NH-Butyl | C$_2$H$_5$ | Red |
| 99 | 6-(methylsulfonyl)benzothiazol-2-yl | H | H | —(CH$_2$)$_2$— | p-(N-methyl-N-phenylamino)phenyl | C$_2$H$_5$ | Red |
| 100 | 6-(trifluoromethyl)benzothiazol-2-yl | CH$_3$ | CH$_3$ | —(CH$_2$)$_2$— | p-methoxy-m-methylphenyl | C$_2$H$_5$ | Red |
| 101 | N-ethylphthalimidyl | —NHCOCH$_3$ | H | —(CH$_2$)$_2$— | p-methoxy-m-methylphenyl | C$_2$H$_5$ | Red |

Example 60-111-continued

The method described in Examples 1-12 and 22-32 is used to prepare the dyes listed in the table below.

$$D-N=N-\underset{\underset{X_1}{\vert}}{\overset{\overset{Y_1}{\vert}}{\bigcirc}}-N\underset{B_1-NH-\overset{O}{\overset{\Vert}{C}}-V}{\overset{R_5}{\diagdown}}$$

| Ex. | D | $X_1$ | $Y_1$ | $B_1$ | V | $R_5$ | Hue on polyester |
|---|---|---|---|---|---|---|---|
| 102 | 2-CN, 4-O$_2$N-phenyl | —NHCOCH$_3$ | H | —(CH$_2$)$_2$— | 2-methoxy-5-methylphenyl | C$_2$H$_5$ | Violet |
| 103 | 4-Br, 6-Br-benzisothiazol-3-yl | CH$_3$ | H | —(CH$_2$)$_2$— | 4-(N-CH$_3$)phenyl | C$_2$H$_5$ | Red |
| 104 | 2-Cl, 4-O$_2$N-phenyl | —NHCOCH$_3$ | H | —(CH$_2$)$_3$— | 4-(N-CH$_3$)phenyl | —C$_2$H$_4$CN | Red |
| 105 | 2-Cl, 4-O$_2$N-phenyl | —NHCOCH$_3$ | H | —(CH$_2$)$_3$— | 4-(N-CH$_3$)phenyl | —C$_2$H$_4$OH | Red |
| 106 | 2-Cl, 4-O$_2$N-phenyl | —NHCOCH$_3$ | H | —(CH$_2$)$_3$— | 4-(N-CH$_3$)phenyl | —CH$_2$—CH(OH)—CH$_3$ | Red |

Example 60-111-continued
The method described in Examples 1-12 and 22-32 is used to prepare the dyes listed in the table below.
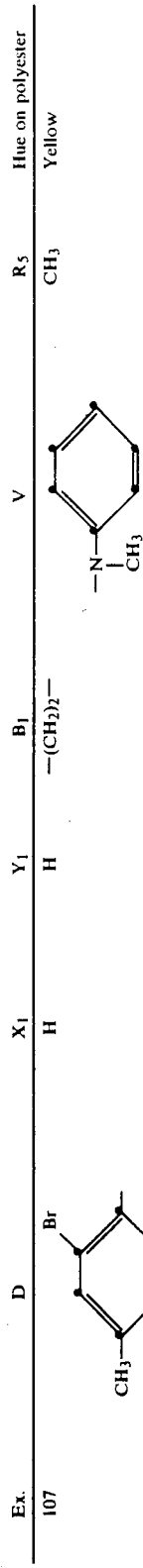
| Ex. | D | $X_1$ | $Y_1$ | $B_1$ | V | $R_5$ | Hue on polyester |
|---|---|---|---|---|---|---|---|
| 107 | 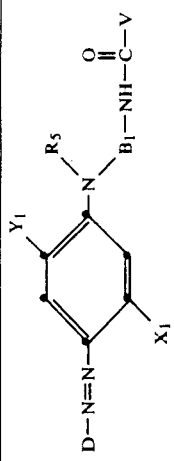 | H | H | —(CH$_2$)$_2$— | —N(CH$_3$)—C$_6$H$_4$— | CH$_3$ | Yellow |
| 108 | | H | H | —(CH$_2$)$_2$— | —N(CH$_3$)—C$_6$H$_4$— | CH$_3$ | Red |
| 109 | | H | H | —(CH$_2$)$_2$— | —N(CH$_3$)—C$_6$H$_4$— | CH$_3$ | Red |
| 110 | | H | H | —(CH$_2$)$_2$— | —N(H)—n-Butyl | CH$_3$ | Red |
| 111 | | H | H | —(CH$_2$)$_2$— | —N (pyridyl) | CH$_3$ | Red |

What is claimed is:

1. A disperse dye of the formula

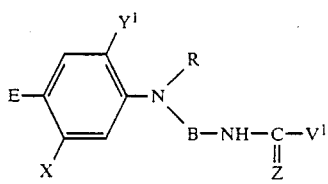

where

E is D—N=N— or

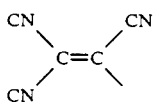

where D is a carbocyclic or heterocyclic diazo component other than aminobenzisothiazole, X is hydrogen, $C_1$-$C_4$alkyl, $C_1$-$C_4$alkoxy, halogen, $C_1$-$C_4$alkylsulfonylamino, a group of the formula —NH—U—$R^3$ where U is —CO— or —$SO_2$— and $R^3$ is $C_1$-$C_4$-alkyl which is unsubstituted or substituted by hydroxy, $C_1$-$C_4$-alkoxy, $C_1$-$C_4$-alkoxycarbonyl, halogen or phenyl or $R^3$ is phenyl which is unsubstituted or substituted by $C_1$-$C_4$-alkyl, $C_1$-$C_4$-alkoxy, halogen, nitro or $C_1$-$C_4$-alkylcarbonylamino or X is a group of the formula —NH—CO—NHQ where Q is hydrogen, $C_1$-$C_4$alkyl or phenyl, Y is hydrogen, halogen, $C_1$-$C_4$alkyl, $C_1$-$C_4$alkoxy, $C_1$-$C_4$alkoxy-$C_1$-$C_4$alkyl or $C_1$-$C_4$alkoxy-$C_2$-$C_4$alkoxy, $R^1$ is $C_1$-$C_{12}$alkyl, $C_2$-$C_6$alkenyl or phenyl, or Y and $R^1$, together with the nitrogen atom and the two C atoms joining them, form a 6-membered ring which is unsubstituted or substituted by 1 to 4 methyl groups, B is a straight-chain or branched $C_2$-$C_6$alkylene, Z is O or S and $V^1$ is a group which eliminates a radical $HV^1$ at temperatures between 180° and 240° C. selected from the group consisting of

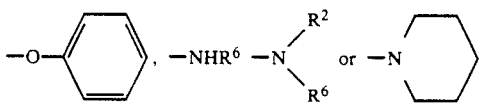

which are unsubstituted or substituted in the phenyl ring by $C_1$-$C_4$alkyl, $C_1$-$C_4$alkoxy, $C_1$-$C_4$alkoxycarbonyl or halogen, where $R^2$ is $C_1$-$C_6$alkyl and $R^6$ is $C_1$-$C_6$alkyl or $C_3$-$C_7$cycloalkyl.

2. A disperse dye according to claim 1, wherein D is a diazo component selected from the group consisting of thienyl, phenylazothienyl, thiazolyl, isothiazolyl, 1,2,4-thiadiazolyl, 1,3,4-thiadiazolyl, benzothiazolyl, pyrazolyl, 1,2,3-triazolyl, 1,2,4-triazolyl, imidazolyl and phenyl, said diazo components being unsubstituted or substituted by alkyl, alkoxy, alkylthio, phenyl, halogen, trifluoromethyl, cyano, nitro, $C_1$-$C_4$alkanoyl, benzoyl, carboalkoxy, alkyl sulfone, phenyl sulfone, phenoxysulfone, sulfonamido or arylazo.

3. A disperse dye according to claim 2, wherein D is benzothiazolyl which is unsubstituted or monosubstituted or disubstituted by chlorine or is a phenyl radical which is monosubstituted or disubstituted by nitro, chlorine, cyano, methylsulfonyl, ethylsulfonyl or phenylazo.

4. A disperse dye according to claim 1, wherein X is hydrogen, methyl, methoxy, chlorine, bromine, acetylamino or ureido.

5. A disperse dye according to claim 1, wherein Y is chlorine, methyl, methoxy, methoxyethyl, methoxyethoxy or hydrogen.

6. A disperse dye according to claim 1, wherein $R^2$ is $C_1$-$C_4$alkyl which is unsubstituted or substituted by hydroxyl, or is $C_1$-$C_4$alkoxy.

7. A disperse dye according to claim 1, wherein $V^1$ is of the formula

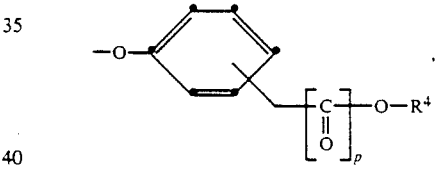

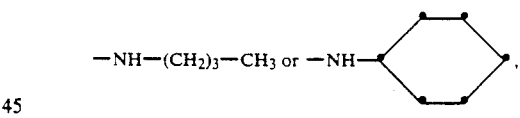

where $R^4$ is $C_1$-$C_4$alkyl and p is 0 or 1.

8. A disperse dye according to claim 1 of the formula

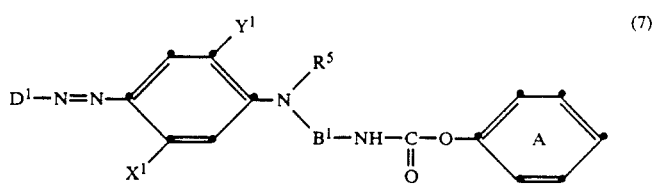

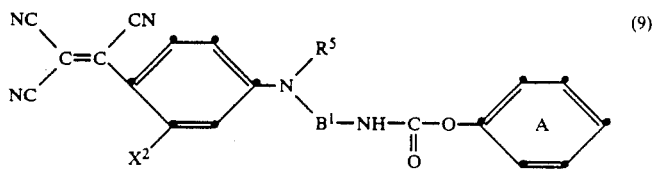

-continued

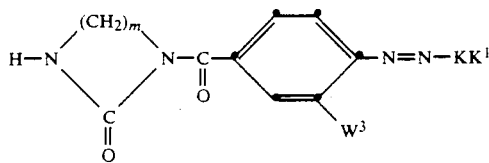
(10)

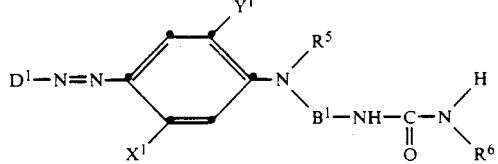
(22)

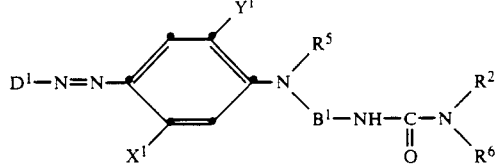
(23)

or

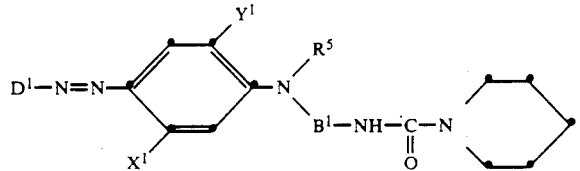
(24)

where
- D¹ is benzothiazolyl which is unsubstituted or monosubstituted or disubstituted by chlorine or is phenyl which is monosubstituted or disubstituted by nitro, halogen, cyano, methylsulfonyl, ethylsulfonyl or phenylazo,
- X¹ is hydrogen, methyl, methoxy, chlorine, bromine or $C_1$-$C_4$alkanoylamino,
- Y¹ is chlorine, methyl, methoxy, methoxyethyl, methoxyethoxy or hydrogen,
- X² is hydrogen, methyl, methoxy, chlorine or bromine,
- R² is $C_1$-$C_6$alkyl,
- R⁵ is $C_1$-$C_4$alkyl which is unsubstituted or substituted by hydroxyl, cyano, $C_1$-$C_4$alkoxy or phenyl,
- R⁶ is $C_1$-$C_6$alkyl or $C_5$-$C_7$cycloalkyl,
- B¹ is $C_2$-$C_4$alkylene which is unsubstituted or substituted by hydroxyl,
- A is phenyl which is unsubstituted or substituted by $C_1$-$C_4$alkyl, $C_1$-$C_4$alkoxy, $C_1$-$C_4$alkoxycarbonyl or chlorine,
- m is 2, 3 or 4,
- W³ is hydrogen, methyl, methoxy, chlorine or nitro and
- KK¹ is an aniline, naphthylamine or tetrahydroquinoline, coupling component each of which is unsubstituted or substituted by $C_1$-$C_4$alkyl, $C_1$-$C_4$alkylcarbonylamino, phenyl or $C_1$-$C_4$alkylphenyl, or is a hydroxypyridone which is substituted by CN or $C_1$-$C_{12}$alkyl.

9. A disperse dye of the formula

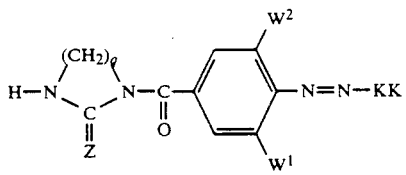
(4)

where
- Z is O or S,
- W¹ and W² are each independently of the other hydrogen, $C_1$-$C_4$alkyl, CN, $CF_3$, $C_1$-$C_4$alkylsulfonyl, halogen, or nitro,
- q is an integer from 2 to 6 and
- KK is a coupling component, wherein the bond between the H—N< group and the >C=Z group is cleaved at temperatures between 180° and 240° C.

10. A disperse dye according to claim 9, wherein KK, is an aniline a naphthylamine or a tetrahydroquinoline coupling component which is unsubstituted or substituted by $C_1$-$C_4$alkyl, $C_1$-$C_4$alkylcarbonylamino, phenyl or $C_1$-$C_4$alkylphenyl.

11. A disperse dye according to claim 9, wherein W¹ and W² are each independently of the other hydrogen, methyl, methoxy, chlorine or nitro.

* * * * *